(12) United States Patent
Yamamoto et al.

(10) Patent No.: US 12,241,683 B2
(45) Date of Patent: Mar. 4, 2025

(54) BURNER FOR PRODUCING INORGANIC SPHEROIDIZED PARTICLES, APPARATUS FOR PRODUCING INORGANIC SPHEROIDIZED PARTICLES, AND METHOD FOR PRODUCING INORGANIC SPHEROIDIZED PARTICLES

(71) Applicant: TAIYO NIPPON SANSO CORPORATION, Tokyo (JP)

(72) Inventors: Yasuyuki Yamamoto, Tokyo (JP); Yoshiyuki Hagihara, Tokyo (JP); Masashi Yamaguchi, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 352 days.

(21) Appl. No.: 17/763,450

(22) PCT Filed: Sep. 11, 2020

(86) PCT No.: PCT/JP2020/034508
§ 371 (c)(1),
(2) Date: Mar. 24, 2022

(87) PCT Pub. No.: WO2021/060028
PCT Pub. Date: Apr. 1, 2021

(65) Prior Publication Data
US 2022/0341666 A1   Oct. 27, 2022

(30) Foreign Application Priority Data
Sep. 26, 2019   (JP) .................................. 2019-175861

(51) Int. Cl.
*F23D 14/00*   (2006.01)
*C01B 33/18*   (2006.01)
(Continued)

(52) U.S. Cl.
CPC .............. *F27B 1/005* (2013.01); *C01B 33/18* (2013.01); *C01F 5/02* (2013.01); *C01F 7/021* (2013.01);
(Continued)

(58) Field of Classification Search
CPC ... B29B 2009/166; F23D 14/56; F23D 14/58; F23D 14/60; F23D 17/005; F23D 91/00;
(Continued)

(56) References Cited

U.S. PATENT DOCUMENTS

| | | | | |
|---|---|---|---|---|
| 873,182 A | * | 12/1907 | Springer | ................... B05B 1/14 239/553.5 |
| 4,147,535 A | * | 4/1979 | Lilja | ......................... F27D 3/16 266/172 |

(Continued)

FOREIGN PATENT DOCUMENTS

| | | |
|---|---|---|
| CN | 1782494 A | 6/2006 |
| CN | 101675301 A | 3/2010 |

(Continued)

OTHER PUBLICATIONS

International Search Report in International Application No. PCT/JP2020/034508, dated Oct. 27, 2020 (4 pages).

(Continued)

*Primary Examiner* — Matthew J Daniels
(74) *Attorney, Agent, or Firm* — Nixon & Vanderhye P.C.

(57) ABSTRACT

One object of the present invention is to provide a burner for producing inorganic spheroidized particles which can efficiently melt and spheroidize even organic powder with a large particle size distribution. The present invention provides a burner for producing inorganic spheroidized particles, including; a raw material powder supply path configured to supply inorganic powder as raw material powder; a first fuel gas supply path (3A) configured to supply a first (Continued)

fuel gas; and a first combustion-supporting gas supply path (4A) configured to supply a first combustion-supporting gas; wherein the raw material powder supply path includes: a first supply path (2A) configured to extend in an axial direction of the burner (1); a first collision wall (2D) configured to be located at the top of the first supply path (2A); a plurality of second supply paths (2B) configured to be branched from the top of the first supply path (2A), and extend radially from the center of the burner (1); one or more dispersion chambers (2C) configured to be located at the top of the second supply path (2B), and have a space in which the cross-sectional area is larger than the cross-sectional area in the second supply path (2B); and one or more raw material ejection holes (2a) configured to communicate with the dispersion chamber (2C).

10 Claims, 12 Drawing Sheets

(51) Int. Cl.

| | | |
|---|---|---|
| *C01F 5/02* | (2006.01) | |
| *C01F 7/021* | (2022.01) | |
| *C01G 49/06* | (2006.01) | |
| *F23D 14/02* | (2006.01) | |
| *F23D 14/70* | (2006.01) | |
| *F27B 1/00* | (2006.01) | |
| *F27B 1/06* | (2006.01) | |
| *F27B 1/08* | (2006.01) | |
| *F27D 17/00* | (2006.01) | |

(52) U.S. Cl.
CPC ............. *C01G 49/06* (2013.01); *F23D 14/02* (2013.01); *F23D 14/70* (2013.01); *F27B 1/06* (2013.01); *F27B 1/08* (2013.01); *C01P 2004/32* (2013.01); *F27D 2017/009* (2013.01)

(58) Field of Classification Search
CPC ............. F23D 2201/00; F23D 2201/10; F23D 2201/20; F23D 2900/14004; F23D 2900/31019
See application file for complete search history.

(56) References Cited

U.S. PATENT DOCUMENTS

| | | | |
|---|---|---|---|
| 4,157,890 A * | 6/1979 | Reed ...................... | F23D 14/58 |
| | | | 431/349 |
| 6,054,073 A | 4/2000 | Kobayashi et al. | |
| 2004/0020210 A1* | 2/2004 | Tanaka ..................... | F23R 3/14 |
| | | | 60/740 |
| 2006/0108724 A1 | 5/2006 | Sato et al. | |
| 2009/0274985 A1 | 11/2009 | McKnight et al. | |
| 2009/0277182 A1* | 11/2009 | Engelbrecht ............. | F23R 3/36 |
| | | | 60/734 |
| 2010/0167054 A1* | 7/2010 | Hagihara ................. | F23D 14/32 |
| | | | 431/185 |
| 2016/0008830 A1* | 1/2016 | Yamamoto ............. | B05B 7/0876 |
| | | | 431/285 |
| 2017/0146242 A1* | 5/2017 | Meadows ............... | F23D 14/64 |
| 2018/0038590 A1* | 2/2018 | Yamamoto ............. | F23D 14/58 |
| 2018/0363896 A1* | 12/2018 | Nielsen .................... | F27B 7/34 |
| 2020/0224872 A1* | 7/2020 | Mu ......................... | F23D 91/00 |

FOREIGN PATENT DOCUMENTS

| | | | | |
|---|---|---|---|---|
| CN | 102032568 A | | 4/2011 | |
| CN | 107250669 A | | 10/2017 | |
| CN | 107532795 A | | 1/2018 | |
| CN | 110285420 A | * | 9/2019 | ............ F23D 14/22 |
| JP | S58-145613 | | 8/1983 | |
| JP | 2001-227710 | | 8/2001 | |
| JP | 3312228 | | 8/2002 | |
| JP | 3331491 | | 10/2002 | |
| JP | 2009-198083 | | 9/2009 | |
| JP | 2016-023853 A | | 2/2016 | |
| JP | 5887178 B2 | | 3/2016 | |
| JP | 6242522 B | | 12/2017 | |
| WO | WO 2004/103548 A1 | | 12/2004 | |
| WO | 2008/146373 | | 12/2008 | |

OTHER PUBLICATIONS

Extended European Search Report mailed Dec. 1, 2023 in European Application No. 20869664.1, 6 pages.
Notification of the First Office Action mailed Apr. 25, 2024 in Chinese Application No. 202080066525.9, with English translation, 21 pages.
Notification to Go Through the Formalities of Registration mailed Aug. 8, 2024 in Chinese Application No. 202080066525.9, with English translation, 8 pages.

* cited by examiner

BURNER FOR PRODUCING INORGANIC SPHEROIDIZED PARTICLES, APPARATUS FOR PRODUCING INORGANIC SPHEROIDIZED PARTICLES, AND METHOD FOR PRODUCING INORGANIC SPHEROIDIZED PARTICLES

This application is the U.S. national phase of International Application No. PCT/JP2020/034508 filed Sep. 11, 2020 which designated the U.S. and claims priority to JP 2019-175861 filed Sep. 26, 2019, the entire contents of each of which are hereby incorporated by reference.

TECHNICAL FIELD

The present invention relates to a burner for producing inorganic spheroidized particles, an apparatus for producing inorganic spheroidized particles, and a method for producing inorganic spheroidized particles.

BACKGROUND ART

Conventionally, a method for producing inorganic spheroidized particles (hereinafter, may be simply referred to as "spheroidized particles") by passing an inorganic powder raw material through a flame is known (Patent Documents 1 to 3).

For example, in an apparatus for producing inorganic spheroidized particles disclosed in Patent Document 2, as shown in FIG. 12, raw material powder is supplied from a raw material feeder (feeder) A and carried into a burner B with carrier gas supplied from a carrier gas supply device A'. Oxygen from an oxygen supply facility C and a fuel gas (liquefied petroleum gas: LPG) from a LPG supply facility D are supplied into the burner B. Then, an exhaust gas containing particles spheroidized in the flame in a vertical furnace E is cooled (temperature diluted) by air introduced from a passage F to the bottom of the vertical furnace E, and the spheroidized particles are collected by a cyclone G and a bag filter H in the subsequent stage.

In order to spheroidize the raw material powder in a flame formed by a burner, a high-temperature flame is required. Therefore, as the burner B shown in FIG. 10, an oxygen combustion burner using a fuel gas and pure oxygen (hereinafter, may be simply referred to as "oxygen burner") is usually used.

As such an oxygen burner, for example, Patent Document 1 discloses a diffusion type burner having a concentric double pipe structure in which a large number of small pipes are provided between an inner pipe and an outer pipe.

Further, Patent Documents 2 and 3 disclose a diffusion type oxygen burner having a concentric quadruple pipe structure. Specifically, the diffusion type burner disclosed in Patent Documents 2 and 3 supplies raw material powder into a combustion chamber using oxygen gas or oxygen-enriched gas as carrier gas from the vicinity of the center including a central axis, a fuel gas from the outer periphery thereof, and first and second oxygen from the outer periphery thereof. A cooling-water passage for cooling the burner is provided on the outermost periphery.

As described above, in the oxygen burner disclosed in Patent Documents 1 to 3, since the fuel gas and the combustion-supporting gas (oxygen gas) are mixed and combusted in the combustion chamber, a high-temperature oxygen combustion flame can be obtained.

PRIOR ART DOCUMENTS

Patent Literature

Patent Document 1: Japanese Patent Application, First Publication No. Sho 58-145613
Patent Document 2: Japanese Patent No. 3331491
Patent Document 3: Japanese Patent No. 3312228

SUMMARY OF INVENTION

Problem to be Solved by the Invention

When inorganic powder is put into a burner flame as a raw material powder and spherical particles are obtained efficiently, it is necessary to form a flame having a temperature more than the melting point of the inorganic powder by an oxygen burner and secure sufficient heating time for the inorganic powder. For that purpose, it is necessary to appropriately disperse the raw material powder in the burner flame and allow the raw material powder to stay for a sufficient time in the burner flame (sufficient heating time).

Generally, the raw material powder has a particle size distribution. For example, a powder having an average particle diameter d50 of 20 µm may include particles having a submicron particle diameter, particles having a particle diameter of several tens of µm, and particles having a particle diameter of 100 µm.

When a powder having a particle size distribution is carried by a fluid flow, particles having a particle diameter of about several µm are likely to agglomerate due to static electricity, although it depends on the physical characteristics and specific gravity of the powder. Therefore, when a powder containing particles having a particle diameter of about several µm is carried by a carrier gas and ejected into a burner flame, the ejection speed of the carrier gas is increased and the powder is ejected and dispersed into the burner flame by the shearing force of the carrier gas. In this case, the residence time (heating time) of the powder in the burner flame is shortened, but the particles having a small particle diameter are sufficiently heated and melted.

On the other hand, particles having a particle diameter of several tens of µm to 100 µm tend to be monodispersed in the fluid flow, so that it is not necessary to increase the ejection speed of the carrier gas. Rather, if the ejection speed of the carrier gas is increased, it is not possible to secure a sufficient residence time (heating time) in the burner flame, and a sufficient amount of heat to melt cannot provide particles with a large particle diameter.

In the conventional diffusion type burner disclosed in Patent Documents 1 to 3 above, in which raw material powder is supplied into the burner flame together with the carrier gas from the vicinity of the central portion of the burner, it is difficult to efficiently melt and spheroidize an organic powder having a large particle size distribution such as particles having a particle diameter of about several µm (fine particles) to particles having a particle diameter of several tens of µm to 100 µm (coarse particles).

The present invention has been made in view of the above circumstances, and an object of the present invention is to provide a burner for producing inorganic spheroidized particles, an apparatus for producing inorganic spheroidized particles, and a method for producing inorganic spheroidized particles which can efficiently melt and spheroidize even organic powder with a large particle size distribution.

Means for Solving the Problem

In order to achieve the objects, the present invention provides the following burner for producing inorganic spheroidized particles.

[1] A burner for producing inorganic spheroidized particles using a fuel gas and a combustion-supporting gas containing oxygen, including;
- a raw material powder supply path configured to supply inorganic powder as raw material powder together with a carrier gas;
- a first fuel gas supply path configured to supply a first fuel gas; and
- a first combustion-supporting gas supply path configured to supply a first combustion-supporting gas;
- wherein the raw material powder supply path includes:
- a first supply path configured to be located in the center of the burner and extend in an axial direction of the burner;
- a first collision wall configured to be located at the top of the first supply path, and intersect perpendicularly with the axial direction of the burner;
- a plurality of second supply paths configured to be branched from the top of the first supply path, and extend radially from the center of the burner when the burner is cross-sectionally viewed;
- one or more dispersion chambers configured to be located at the top of the second supply path, communicate with the second supply path, and have a space in which the cross-sectional area in the direction perpendicular to the direction in which the second supply path extends is larger than the cross-sectional area in the second supply path; and
- one or more raw material ejection holes configured to communicate with the dispersion chamber, and extend in the axial direction.

[2] The burner for producing inorganic spheroidized particles according to [1],
wherein the burner further includes a dispersion mechanism configured to be located at a wall surface of the first collision wall, and change a carrying vector of the raw material powder from the axial direction toward the radial direction of the burner at least once.

[3] The burner for producing inorganic spheroidized particles according to [2],
wherein the dispersion mechanism is a convex portion having one top portion protruding from the wall surface.

[4] The burner for producing inorganic spheroidized particles according to [3],
wherein the top portion is located on the central axis of the burner 1.

[5] The burner for producing inorganic spheroidized particles according any one of [1] to [4],
wherein the dispersion chamber includes a second collision wall which intersects a direction in which the second supply path extends.

[6] The burner for producing inorganic spheroidized particles according to [5],
wherein when the burner is viewed in plan view, the raw material powder ejection hole is located closer to the center than the second collision wall.

[7] The burner for producing inorganic spheroidized particles according to any one of [1] to [6],
wherein when the tip of the burner is viewed in plan view, openings of the raw material powder ejection holes are arranged on a circumference of a circle which is centered on the central axis of the burner 1, and has a diameter larger than a diameter of the first supply path 2A

[8] The burner for producing inorganic spheroidized particles according to any one of [1] to [7],
wherein the burner further includes a plurality of first premixing chambers configured to be located at a position near the tip of the burner, and mix the first fuel gas and the first combustion-supporting gas,
the first fuel gas supply path branches into a plurality of first fuel supply branched flow paths near the tip of the burner in the axial direction,
the first combustion-supporting gas supply path branches into a plurality of first combustion-supporting gas supply branched flow paths near the tip of the burner in the axial direction, and
the first premixing chamber communicates with any one of the first fuel supply branched flow paths and any one of the first combustion-supporting gas supply branched flow paths.

[9] The burner for producing inorganic spheroidized particles according to [8],
wherein each of a plurality of the first premixing chambers has an opening at the tip of the burner in the axial direction.

[10] The burner for producing inorganic spheroidized particles according to [8] or [9],
wherein the first fuel supply branched flow paths are arranged inside the first combustion-supporting gas supply branched flow paths.

[11] The burner for producing inorganic spheroidized particles according to [10],
wherein a tip of the first fuel supply branched flow path is arranged inside the first combustion-supporting gas supply branched flow path,
a space from the tip of the first fuel supply branched flow path to the tip of the first combustion-supporting gas supply branched flow path is the first premixing chamber, and
an opening at the tip of the first combustion-supporting gas supply branched flow path is an opening of the first premixing chamber.

[12] The burner for producing inorganic spheroidized particles according to [11],
wherein when the tip of the burner is viewed in plan view, the openings of a plurality of the first premixing chambers are arranged in an annular shape centered on the central axis of the burner on either or both the inside and outside of the raw material powder ejection holes arranged in an annular shape.

[13] The burner for producing inorganic spheroidized particles according to [11],
wherein the burner further includes:
a second fuel gas supply path configured to supply a second fuel gas;
a second combustion-supporting gas supply path configured to supply a second combustion-supporting gas; and
a plurality of second premixing chambers configured to be located at a position near the tip of the burner in the axial direction, and mix the second fuel gas and the second combustion-supporting gas;
the second fuel gas supply path branches into a plurality of second fuel supply branched flow paths at a portion near the tip of the burner;

the second combustion-supporting gas supply path branches into a plurality of second combustion-supporting gas supply branched flow paths at a portion near the tip of the burner;

a tip of the second fuel supply branched flow path is arranged inside the second combustion-supporting gas supply branched flow path, and a space from the tip of the second fuel supply branched flow path to the tip of the second combustion-supporting gas supply branched flow path is the second premixing chamber; and an opening of the tip of the second combustion-supporting gas supply branched flow path is an opening of the second premixing chamber.

[14] The burner for producing inorganic spheroidized particles according to [13], wherein when the tip of the burner is viewed in plan view, the openings of a plurality of the first premixing chambers are arranged in an annular shape centered on the central axis of the burner on either the inside or the outside of the opening of the raw material powder ejection holes arranged in an annular shape, and the openings of a plurality of the second premixing chambers are arranged in an annular shape centered on the central axis of the burner on the other side.

[15] An apparatus for producing inorganic spheroidized particles, including:

a burner according to any one of [1] to [14], a vertical spheroidizing furnace in which the burner for producing inorganic spheroidized particles is connected vertically downward to the top thereof; and a cyclone and a bag filter provided in a subsequent stage of the spheroidizing furnace.

[16] A method for producing inorganic spheroidized particles in which inorganic powder as a raw material powder is melted and spheroidized by a burner flame formed by combustion of a fuel gas and a combustion-supporting gas containing oxygen, wherein the method includes a step of changing a carrying vector of the raw material powder one or more times from the axial direction to the radial direction of the burner when the raw material powder is supplied in the burner flame together with a carrying gas.

[17] The method for producing inorganic spheroidized particles according to [16], wherein the fuel gas and the combustion-supporting gas are supplied into a plurality of the premixing chambers, mixed in advance, combusted to generate a flame, and the inorganic powder is sent into the flame.

Effects of the Invention

The burner for producing inorganic spheroidized particles of the present invention can efficiently melt and spheroidize even an organic powder having a large particle size distribution.

Since the apparatus for producing inorganic spheroidized particles of the present invention includes the burner for producing inorganic spheroidized particles, even an organic powder having a large particle size distribution can be efficiently melted and spheroidized.

The method for producing inorganic spheroidized particles of the present invention can efficiently melt and spheroidize even an organic powder having a large particle size distribution.

DETAILED DESCRIPTION OF THE PREFERRED EMBODIMENTS

First Embodiment

Figure 1:
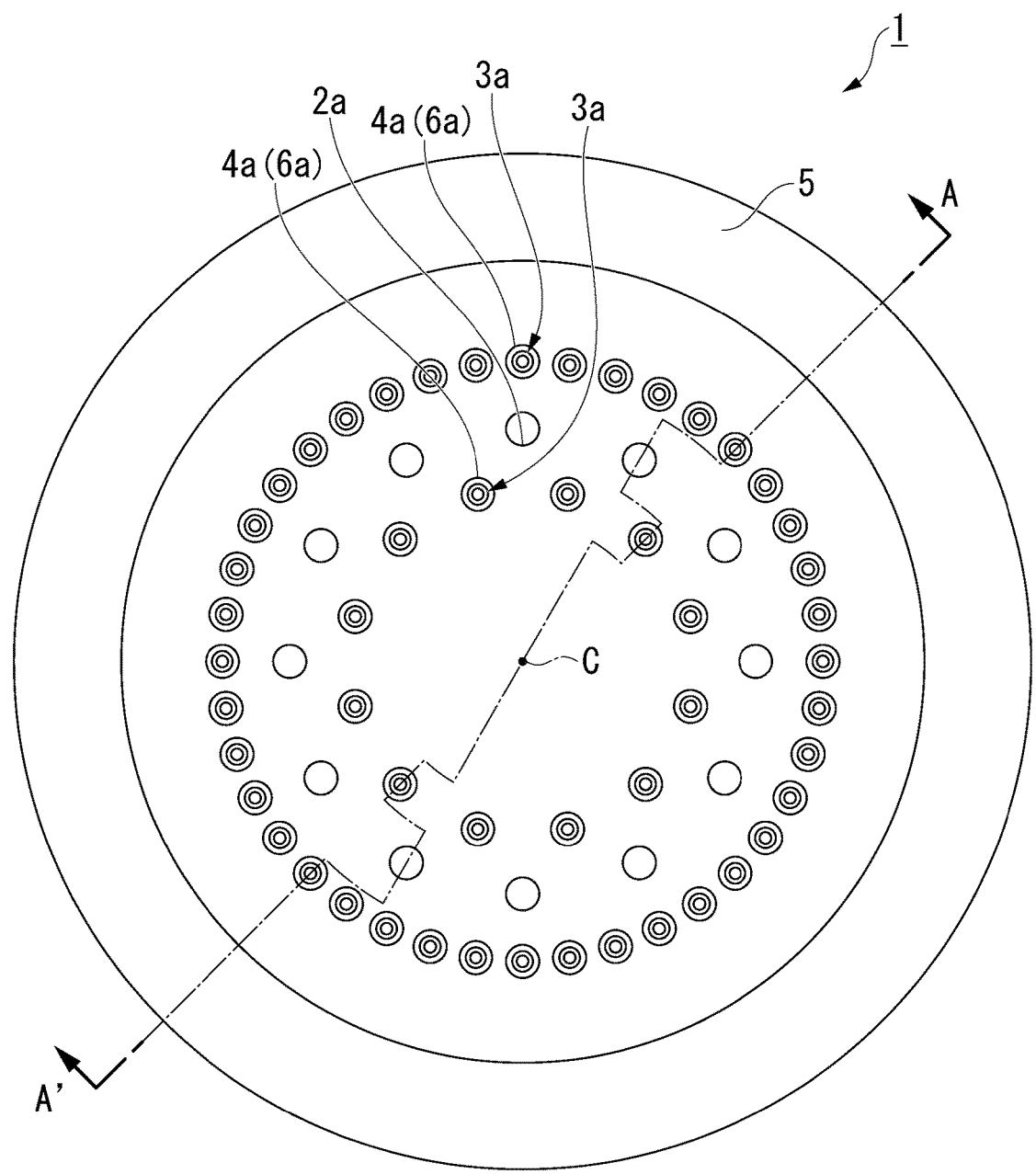
FIG. 1 is a plan view showing a burner of a first embodiment according to the present invention.

Hereinafter, a burner for producing inorganic spheroidized particles of the first embodiment according to the present invention will be described in detail using drawings together with an apparatus and a method for producing inorganic spheroidized particles using the burner. In addition, in the drawings used in the following explanation, in order to make the features easy to understand, the featured parts may be enlarged for convenience, and the dimensional ratios of each component may not be the same as the actual ones.

(Burner for Producing Inorganic Spheroidized Particles)

Figure 2:
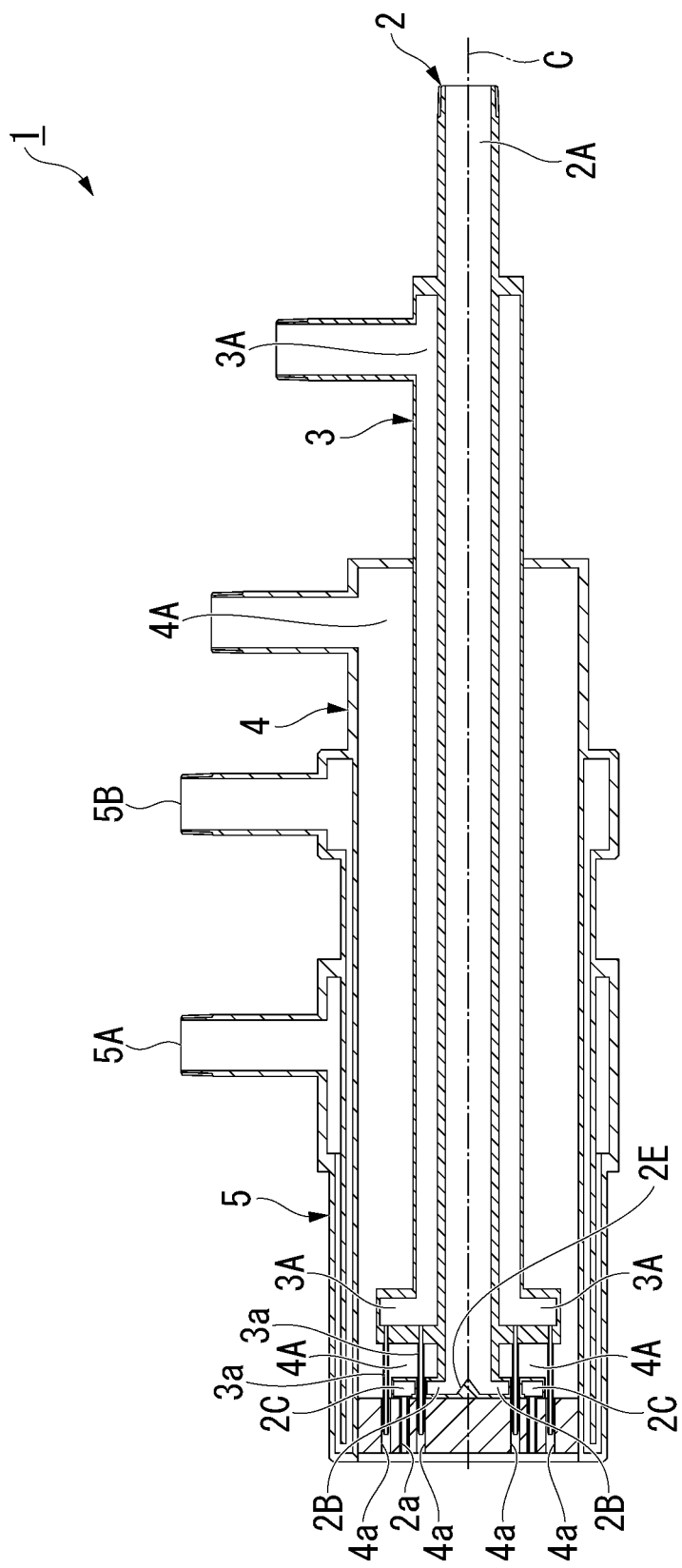
FIG. 2 is a cross-sectional view taken along the line A-A' shown in FIG. 1.
Figure 3:
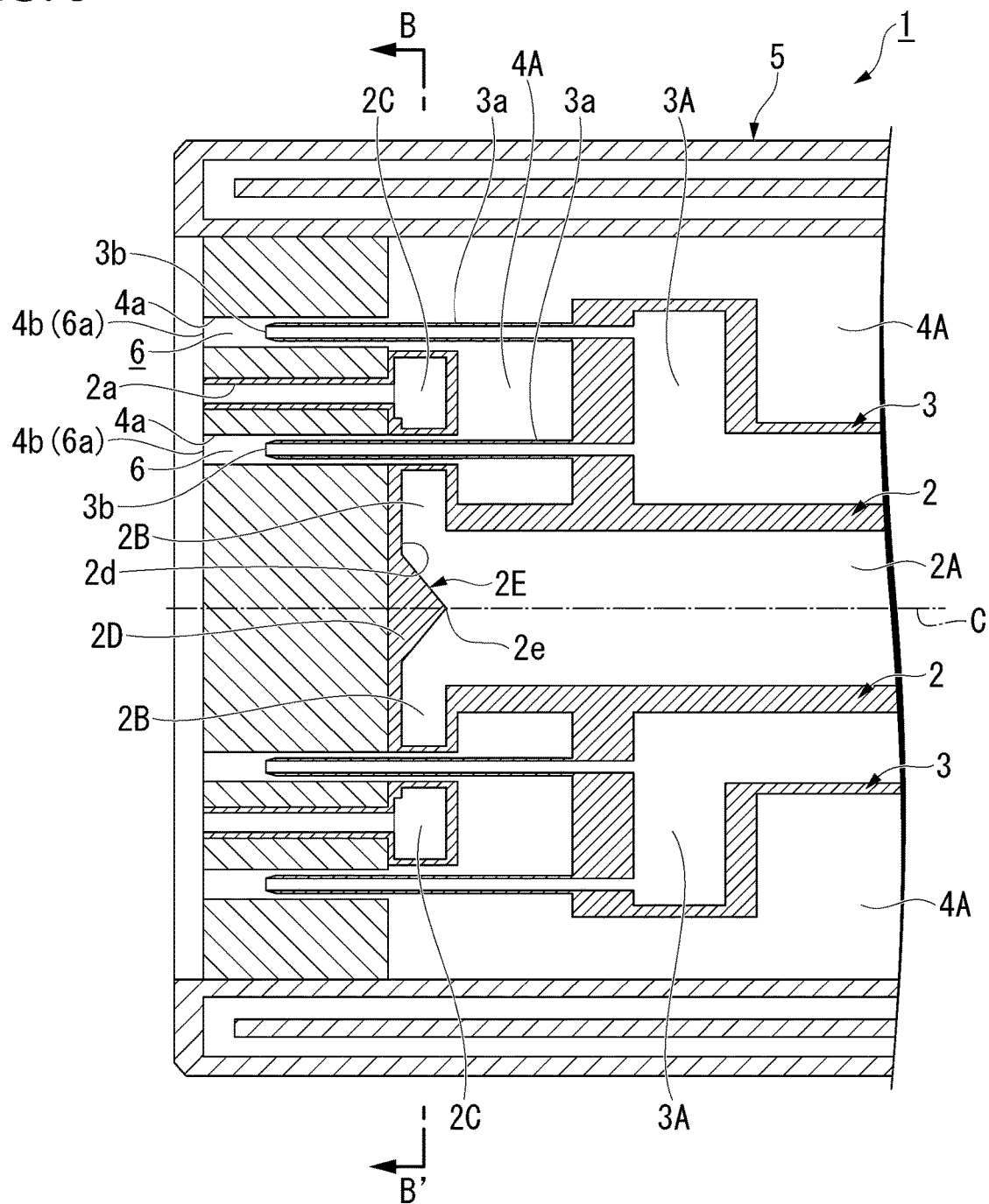
FIG. 3 is an enlarged cross-sectional view showing the burner shown in FIG. 2.
Figure 4:
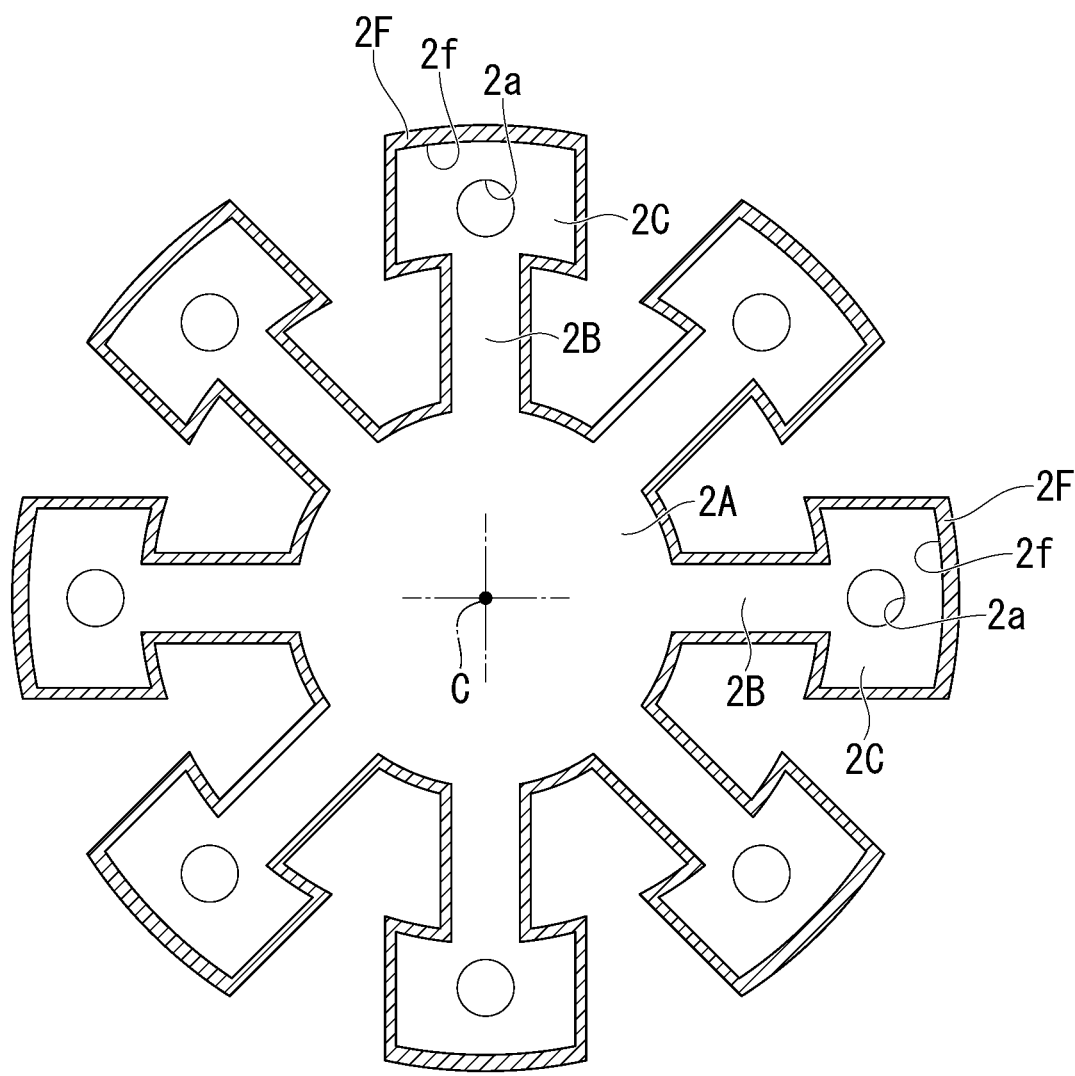
FIG. 4 is a cross-sectional view taken along the line B-B' shown in FIG. 3.

First, the burner for producing inorganic spheroidized particles of the first embodiment according to the present invention will be described. FIGS. 1 to 4 show the burner for producing inorganic spheroidized particles (hereinafter, may be simply referred to as "burner") of the first embodiment according to the present invention. FIG. 1 is a plan view of the burner from the tip side. FIG. 2 is a cross-sectional view cut along A-A' through the central axis C of the burner shown in FIG. 1. FIG. 3 is an enlarged cross-sectional view of the tip side of the burner. FIG. 4 is a cross-sectional view taken along the line B-B' shown in FIG. 3.

As shown in FIGS. 1 to 3, a burner 1 has a concentric multi-pipe structure including a raw material powder supply pipe 2, a first fuel supply pipe 3, a first combustion-supporting gas supply pipe 4, and a water-cooling jacket 5 disposed from the central axis C of the burner 1 toward the outside in the circumferential direction. Further, the burner 1 is an oxygen combustion burner using a fuel gas and a combustion-supporting gas containing oxygen.

As shown in FIG. 2, the raw material powder supply pipe 2 extends along the axial direction of the burner 1 at the innermost portion of the concentric multi-pipe structure of the burner 1. The space inside the raw material powder supply pipe 2 is a raw material powder supply path 2A. As a result, it is possible to supply inorganic powder as raw material powder as a mixture with carrier gas.

The raw material powder supply pipe 2 may be configured to be divisible by a combination of a plurality of members, or may be configured by a single member.

As shown in FIGS. 2 to 4, the raw material powder supply path includes a first supply path 2A, a second supply path 2B, a dispersion chamber 2C, a raw material powder ejection hole 2a and a first collision wall 2D.

The first supply path 2A is located in the center of the burner 1 and extends axially from the base end to the tip of the burner 1. The base end of the first supply path 2A is connected to a source of raw material powder (not shown) and a source of carrier gas (not shown). The tip of the first supply path 2A is branched into a plurality of second supply paths 2B.

The first collision wall 2D is located at the tip of the first supply path 2A. The first collision wall 2D has a first wall surface 2d that intersects perpendicularly with the axial direction of the burner 1. The first wall surface 2d is flat.

In the burner 1 of the present embodiment, since the first collision wall 2D is located at the tip of the first supply path 2A, the raw material powder carried by the carrier gas collides with the first wall surface 2d. As a result, particles (fine particles) having a particle diameter of about several μm contained in the raw material powder are dispersed, and particles (coarse particles) having a particle diameter of several tens of μm to 100 μm are decelerated.

On the first wall surface 2d of the first collision wall 2D, a dispersion mechanism 2E which changes the carrying vector of the raw material powder from the axial direction of the burner 1 toward the radial direction at least once is located.

The dispersion mechanism 2E is a convex portion (convex body) having one top portion 2e protruding from the first wall surface 2d.

As shown in FIGS. 2 and 3, the dispersion mechanism 2E is arranged in the center of the first wall surface 2d so that the top portion 2e is located on the central axis C of the burner 1.

The size of the dispersion mechanism 2E is not particularly limited, but it is preferable that the area on the base end side of the dispersion mechanism 2E be equal to or less than the cross-sectional area of the first supply path 2A. As a result, at the tip of the first supply path 2A, the raw material powder carried by the carrier gas can be reliably collided with the dispersion mechanism 2E and the first wall surface 2d.

The shape of the dispersion mechanism 2E is not particularly limited, a cone or polygonal pyramid having the top 2e is preferable, and a cone is more preferable from the viewpoint of evenly supplying the mixture of the raw material powder and the carrier gas after being collided with the dispersion mechanism 2E or the first wall surface 2d into a plurality of second supply paths 2B described later.

Only one dispersion mechanism 2E is provided on the first wall surface 2d.

The dispersion mechanism 2E may be integrally formed as the same member as the first wall surface 2d, or may be a separate member from the first wall surface 2d.

The material of the dispersion mechanism 2E is not particularly limited, but in the case of the dispersion mechanism 2E being a separate member from the first wall surface 2d, the dispersion mechanism 2E may be made of the same material or a different material from the first wall surface 2d.

As shown in FIGS. 2 to 4, the second supply path 2B branches from the tip of the first supply path 2A. As shown in FIG. 4, when the raw material powder supply pipe 2 is cross-sectionally viewed in a direction perpendicular to the axial direction of the burner 1, the second supply path 2B extends radially from the center of the burner 1. Specifically, in the burner 1 of the present embodiment, the tip of the first supply path 2A is branched into eight second supply paths 2B so as to be equally divided into eight in the circumferential direction. The base end of the second supply path 2B communicates with the first supply path 2A, and the tip communicates with the dispersion chamber 2C.

As shown in FIGS. 2 and 3, when the tip of the burner 1 is cross-sectionally viewed in a direction parallel to the axial direction of the burner 1, the direction in which the first supply path 2A extends and the direction in which the second supply path 2B extends are orthogonal to each other.

That is, in the burner 1 of the present embodiment, the carrying vector of the raw material powder carried by the carrier gas is changed from the axial direction to the vertical direction of the burner 1 when the first supply path 2A collides with the first collision wall 2D and then transferred into the second supply path 2B.

Further, the dispersion mechanism 2E provided on the first collision wall 2D changes the carrying vector of the raw material powder once from the axial direction to the radial direction of the burner 1. Therefore, the mixture of the raw material powder and the carrier gas can be smoothly carried into the second supply path 2B.

As shown in FIGS. 2 to 4, the dispersion chamber 2C is located at the tip of the second supply path 2B and communicates with the second supply path 2B. In the burner 1 of the present embodiment, as shown in FIG. 4, one dispersion chamber 2C communicates with one second supply path 2B, and eight dispersion chambers 2C are provided outside the first supply path 2A. Therefore, the mixture of the raw material powder and the carrier gas is introduced into the dispersion chamber 2C from the second supply path 2B.

The dispersion chamber 2C has a space wider than the second supply path 2B, that is, a space in which the cross-sectional area in the direction perpendicular to the direction in which the second supply path 2B extends is larger than the cross-sectional area in the second supply path 2B. Therefore, when the mixture of raw material powder and carrier gas is introduced into the dispersion chamber 2C from the second supply path 2B, the carrying speed is reduced. In particular, particles (coarse particles) having a particle diameter of several tens of μm to 100 μm contained in the raw material powder are greatly decelerated.

The dispersion chamber 2C has a second collision wall 2F which intersects the direction in which the second supply path 2B extends. The second collision wall 2F faces the dispersion chamber 2C and has a second wall surface 2f which intersects perpendicularly with the direction in which the second supply path 2B extends. The second wall surface 2f is a bowl curved surface.

In the burner 1 of the present embodiment, the second collision wall 2F of the dispersion chamber 2C is located in front of the direction in which the second supply path 2B extends from the first supply path 2A. Therefore, the raw material powder decelerated when introduced into the dispersion chamber 2C from the second supply path 2B further collides with the second wall surface 2f. As a result, in the dispersion chamber 2C, the particles (fine particles) having a particle diameter of about several μm contained in the raw material powder are further dispersed, and the particles (coarse particles) having a particle diameter of several tens of μm to 100 μm are further decelerated. That is, the dispersion chamber 2C is a dispersion part of fine particles and a deceleration part of coarse particles.

The raw material powder ejection hole 2a extends in the axial direction of the burner 1 as shown in FIGS. 2 and 3. The base end of the raw material powder ejection hole 2a communicates with the dispersion chamber 2C as shown in FIGS. 2 to 4. The tip of the raw material powder ejection hole 2a opens at the tip of the burner 1 as shown in FIGS. 1 to 3. In the burner 1 of the present embodiment, as shown in FIG. 4, one raw material powder ejection hole 2a communicates with one dispersion chamber 2C. Eight raw material powder ejection holes 2a are formed at an inner side with respect to the second collision wall 2F. Further, in the burner 1 of the present embodiment, when the raw material powder is ejected from the raw material powder ejection hole 2a, the carrying vector of the raw material powder is changed from the radial direction to the axial direction of the burner 1.

Further, in the burner 1 of the present embodiment, when the burner 1 is cross-sectionally viewed, the raw material powder ejection hole 2a is located closer to the center than the second collision wall 2F. Therefore, the raw material powder which has been appropriately dispersed in the dispersion chamber 2C can be supplied from the raw material powder ejection hole 2a to the burner flame at an appropriate ejection speed, not immediately after the collision with the second wall surface 2f.

As shown in FIG. 1, when the tip of the burner 1 is viewed in plan view, the openings of the raw material powder ejection holes 2a are arranged at equal intervals on the circumference of a circle which is centered on the central axis C of the burner 1, and has a diameter larger than the diameter of the first supply path 2A. As a result, the heat generated by the flame formed inside or outside the raw material powder supply hole 2a can be efficiently received by the raw material powder.

The raw material powder is not particularly limited as long as it is a compound (inorganic powder) from which desirable spherical particles can be obtained. Specific examples of such a compound include inorganic oxides such as $SiO_2$, $Al_2O_3$, $MgO$ and $Fe_2O_3$.

The particle morphology of the raw material powder is not particularly limited, and may be non-spherical particles having corners or spherical particles having no corners.

The particle size of the raw material powder is preferably in the range from 1 to 500 μm, and preferably in the range from 1 to 100 μm. Here, if the particle size of the raw material powder is less than 1 μm, the particles aggregate due to static electricity, and if it exceeds 500 μm, it cannot be sufficiently heated in a burner flame, which is not preferable. On the other hand, if it is within the range above, it is preferable because the raw material powder can be sufficiently heated and spheroidized while being appropriately dispersed in the flame.

In the burner 1 of the present embodiment, the raw material powder may have a large particle size distribution. Specifically, the raw material powder may contain both particles (fine particles) having a particle diameter of about several μm and particles (coarse particles) having a particle diameter of several tens of μm to 100 μm. Further, the raw material powder may contain only fine particles or may contain only coarse particles. According to the burner 1 of the present embodiment, the particle group having a small particle diameter contained in the raw material powder can be set to an appropriate dispersed state, and the particle group having a large particle diameter contained in the raw material powder can be decelerated to obtain an appropriate ejection speed.

The carrier gas is not particularly limited as long as it is a gas capable of carrying the raw material powder. Specifically, for example, when safety is taken into consideration, an inert gas such as nitrogen gas or argon gas can be used as the carrier gas. On the other hand, when oxygen or oxygen-enriched air is used as the carrier gas, the carrier gas can be also used as a combustion-supporting agent for the raw material powder. As a result, when forming a flame described later, a higher-temperature flame can be formed.

The flow rate of the carrier gas is not particularly limited, and can be appropriately adjusted so that the ejection speed of the raw material powder ejected from the raw material powder ejection hole 2a is within an appropriate range.

As shown in FIG. 2, the first fuel supply pipe 3 is provided so as to cover the outside of the raw material powder supply pipe 2. The central axis of the first fuel supply pipe 3 and the central axis of the raw material powder supply pipe 2 coincide with each other, and the first fuel supply pipe 3 is provided coaxially with the raw material powder supply pipe 2.

The annular space provided between the first fuel supply pipe 3 and the raw material powder supply pipe 2 is a first fuel gas supply path 3A for supplying the first fuel gas. In other words, the first fuel gas supply path 3A is provided so as to cover the outer periphery of the first powder supply path 2A.

The base end side of the first fuel gas supply path 3A is connected to a first fuel gas supply source (not shown in figures).

The first fuel gas is not particularly limited and may be a substance containing a carbon source or a substance containing no carbon source.

Examples of the substance containing a carbon source include gaseous fuels such as methane ($CH_4$) and propane ($C_3H_8$). Further, if the burner 1 has a liquid atomization mechanism, a liquid fuel such as kerosene or alcohol can also be used.

Examples of the substances containing no carbon source include ammonia ($NH_3$) and hydrogen ($H_2$).

If necessary, the first fuel gas may be diluted with an inert gas such as nitrogen gas, and argon gas.

The tip of the first fuel gas supply path 3A is closer to the base end side than the position at which the raw material powder supply path 2A branches into a plurality of raw material powder branched flow paths 2B in the axial direction of the burner 1. Therefore, the first fuel gas supply path 3A is not provided on the outer periphery of the portion near the tip of the first powder supply path 2A.

The annular space near the tip of the first fuel gas supply path 3A has a larger outer diameter than the that of the base end portion and the central portion. The outer periphery of the annular space near the tip of the first fuel gas supply path 3A is preferably outside the position of the raw material powder ejection hole 2a. As a result, as shown in FIG. 1, when the tip of the burner 1 is viewed in plan view, the first fuel gas for forming a flame can be supplied to a position outside the plurality of raw material powder ejection holes 2a.

As shown in FIGS. 2 and 3, a plurality of first fuel gas ejection nozzles (first fuel branched flow paths) 3a extending in the direction parallel to the axial direction of the burner 1 are connected to the tip portion of the first fuel gas supply path 3A of which the diameter is expanded in the circumferential direction from the central axis C of the burner 1. The first fuel gas supply path 3A and a space inside the plurality of first fuel gas ejection nozzles 3a communicate with each other. As a result, a fuel gas can be supplied from the first fuel gas supply path 3A to the plurality of first fuel gas ejection nozzles 3a. In other words, the first fuel gas supply path 3A is branched into a plurality of the first fuel gas ejection nozzles 3a at a portion near the tip of the burner 1.

As shown in FIG. 2, the first combustion-supporting gas supply pipe 4 is provided so as to cover the outside of the first fuel supply pipe 3. The central axis of the first combustion-supporting gas supply pipe 4 coincides with the central axis of the first fuel supply pipe 3, and the first combustion-supporting gas supply pipe 4 is provided coaxially with the first fuel supply pipe 3 and the raw material powder supply pipe 2.

The annular space provided between the first combustion-supporting gas supply pipe 4 and the first fuel supply pipe 3 is a first combustion-supporting gas supply path 4A for supplying a first combustion-supporting gas. In other words, the first combustion-supporting gas supply path 4A is provided so as to cover the tip and the outer circumference of the first fuel gas supply path 3A.

The base end of the first combustion-supporting gas supply path 4A is connected to a first combustion-supporting gas supply source (not shown in figures).

The first combustion-supporting gas is not particularly limited as long as it is a gas capable of reacting with the first fuel gas to form a flame atmosphere. Examples of the first combustion-supporting gas include oxygen, and oxygen-enriched air.

The tip of the first combustion-supporting gas supply path 4A is on the tip side of the position at which the raw material powder supply path 2A branches into a plurality of raw material powder branched flow paths 2B in the axial direction of the burner 1. Therefore, the first combustion-supporting gas supply path 4A is provided so as to cover the outer periphery of the portion near the tip of the first powder supply path 2A.

The annular space near the tip of the first combustion-supporting gas supply path 4A has a smaller inner diameter than that of the base end portion and the central portion. The inner periphery of the annular space near the tip of the first combustion-supporting gas supply path 4A is preferably inside the raw material powder ejection hole 2a. As a result, as shown in FIG. 1, when the tip of the burner 1 is viewed in plan view, the first combustion-supporting gas for forming a flame can be supplied inside a plurality of the raw material powder ejection holes 2a.

As shown in FIGS. 2 and 3, the tip of the first combustion-supporting gas supply path 4A of which the diameter is expanded from the outside in the circumferential direction toward the central axis C of the burner 1 is connected to a plurality of first combustion-supporting gas supply holes (first combustion-supporting gas supply branched flow paths) 4a which extends in a direction parallel to the axial direction of the burner 1. The first combustion-supporting gas supply path 4A and the space inside the plurality of first combustion-supporting gas supply holes 4a communicate with each other. As a result, the first combustion-supporting gas can be supplied from the first combustion-supporting gas supply path 4A to the plurality of the first combustion-supporting gas supply holes 4a. In other words, the first combustion-supporting gas supply path 4A branches into a plurality of the first combustion-supporting gas supply holes 4a at the portion near the tip of the burner 1.

As shown in FIG. 2, the water-cooling jacket 5 is provided so as to cover the outside of the first combustion-supporting gas supply pipe 4. The water-cooling jacket 5 is provided with a cooling-water inlet 5A and a cooling-water outlet 5B. As a result, the cooling-water supplied from the cooling-water inlet 5A into the flow path in the water-cooling jacket 5 is discharged from the cooling-water outlet 5B after cooling the burner 1 particularly near the tip of the burner 1.

In the burner 1 of the present embodiment, as shown in FIG. 3, the first fuel gas ejection nozzle 3a is arranged inside the first combustion-supporting gas supply hole 4a. Further, a tip 3b of the first fuel gas ejection nozzle 3a is arranged inside the first combustion-supporting gas supply hole 4a. That is, the first fuel gas ejection nozzle 3a opens inside the first combustion-supporting gas supply hole 4a.

When the first fuel gas is ejected from the tip 3b of the first fuel gas ejection nozzle 3a into the inside of the first combustion-supporting gas supply hole 4a, and the combustion-supporting gas is supplied from the first combustion-supporting gas supply path 4A toward the inside of the first combustion-supporting gas supply hole 4a, the first fuel gas and the first combustion-supporting gas are mixed inside the first combustion-supporting gas supply hole 4a in front of the tip 3b of the first fuel gas ejection nozzle 3a.

As described above, the space from the tip 3b of the first fuel gas ejection nozzle 3a to a tip 4b of the first combustion-supporting gas supply hole 4a is a first premixing chamber 6 for mixing the first fuel gas and the first combustion-supporting gas. Further, the opening at the tip 4b of the first combustion-supporting gas supply hole 4a is an opening 6a of the first premixing chamber 6.

In other words, the burner 1 according to the present embodiment includes a plurality of the first premixing chambers 6. These first premixing chambers 6 are arranged at a position near to the tip of the burner 1 in the axial direction. The first premixing chamber 6 communicates with one of the first fuel gas ejection nozzles 3a and one of the combustion-supporting gas supply holes 4a. The first premixing chamber 6 opens at the tip of the burner 1 in the axial direction.

A volume v1 of the first premixing chamber 6 is not particularly limited as long as the first fuel gas and the first combustion-supporting gas can be sufficiently mixed and there is no risk of flashback.

For example, when a total flow rate Q1 of the first fuel gas and the first combustion-supporting gas is 25 to 50 [Nm$^3$/h], the volume v1 [m$^3$] is preferably in a range from $3.0\times10^{-5}$ to $1.0\times10^{-3}$ [m$^3$], and more preferably in a range from $1.0\times10^{-4}$ to $1.0\times10^{-3}$ [m$^3$]. When the volume v1 is in the range from $1.0\times10^{-4}$ to $1.0\times10^{-3}$ [m$^3$], the first fuel gas and the first combustion-supporting gas can be sufficiently mixed.

Further, an offset distance L1 from the tip 3b of the first fuel gas ejection nozzle 3a to the tip 4b of the first combustion-supporting gas supply hole 4a is preferably in a range from $1.0\times10^{-3}$ to $1.0\times10^{-1}$ [m], and more preferably in a range from $2\times10^{-3}$ to $5\times10^{-2}$ [in].

Further, the number and volume of the first premixing chamber 6 can be appropriately selected according to the supply amount of the mixed gas of the first fuel gas and the first combustion-supporting gas, and the number, the volume, and the layout (arrangement) of the raw material powder ejection hole 2a.

In the first premixing chamber 6, the first fuel gas and the first combustion-supporting gas are mixed in advance and ejected as a mixed gas from the opening 6a in a direction parallel to the axial direction of the burner 1.

The burner 1 according to the present embodiment includes a plurality of the first premixing chambers 6 having a small volume, and the first fuel gas and the first combustion-supporting gas are premixed in these first premixing chambers 6. As a result, when the substance containing no carbon source is used as the first fuel gas, the first fuel gas and the first combustion-supporting gas can be sufficiently mixed to improve the combustion efficiency, and there is no risk of flashback.

As shown in FIG. 1, when the tip of the burner 1 is viewed in plan view, the openings 6a of the plurality of the first premixing chambers 6 are arranged at equal intervals on the inside and outside of the raw material powder ejection holes 2a arranged in an annular shape centered on the central axis C of the burner 1 so as to be concentric circles. That is, the raw material powder ejection holes 2a are surrounded inside and outside by the openings 6a of the first premixing chambers 6.

In order to form a flame (hereinafter, also referred to as "first flame") by the mixed gas of the first fuel gas and the first combustion-supporting gas in the central portion (center portion) of the burner 1 according to the present embodiment, the openings 6a of a plurality of the first premixing chambers 6 are arranged in an annular shape, and a plurality of the raw material powder ejection holes 2a are arranged in an annular shape so as to surround the outer periphery of the first flame in the burner 1. Further, in order to form a flame (hereinafter, also referred to as "second flame") by the mixed gas of the first fuel gas and the first combustion-supporting gas so as to surround the outer periphery of the raw material powder ejection holes 2a, the openings 6a of a plurality of the first premixing chambers 6 are arranged in an annular shape so as to surround the outer periphery of the raw material powder ejection holes 2a. As a result, the heat of the flame can be efficiently transferred to the raw material powder ejected from the raw material powder ejection holes 2a, and the raw material powder can be efficiently melted.

Further, by forming the second flame so as to surround the outer periphery of the raw material powder ejection holes 2a, the entrained air from the periphery of the burner 1 or the combustion exhaust gas in the furnace can be blocked, so that the efficiency of melting and spheroidizing of the inorganic powder can be improved.

(Apparatus for Producing Inorganic Spheroidized Particles)

Next, an example of an apparatus for producing inorganic spheroidized particles using the burner 1 described above will be described.

Figure 12:
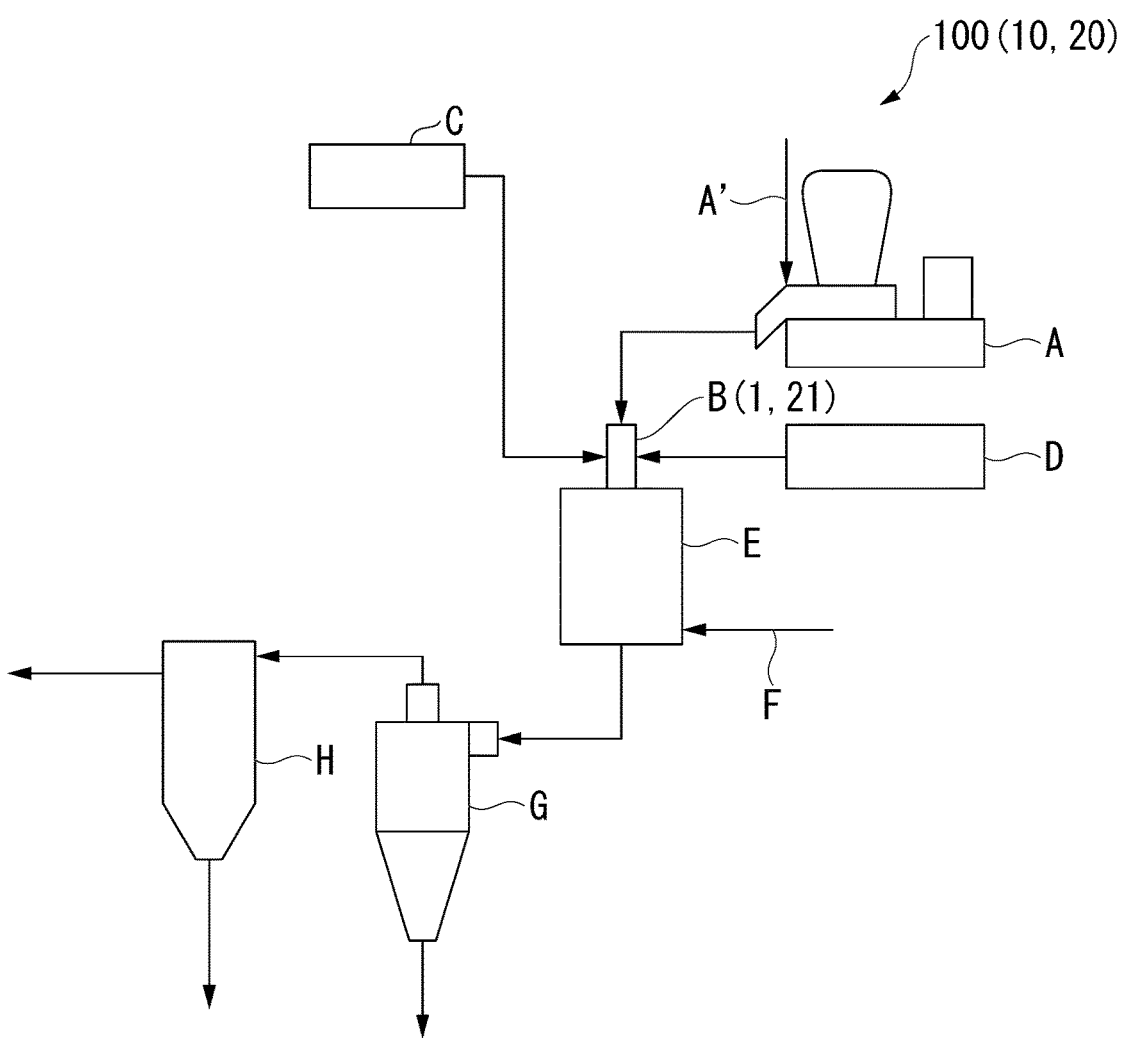
FIG. 12 is a system diagram showing a conventional apparatus for producing inorganic spheroidized particles.

An apparatus 10 for producing inorganic spheroidized particles according to the present invention uses the burner 1 instead of the burner B in a conventional apparatus 100 for producing inorganic spheroidized particles shown in FIG. 12.

Reference numeral E in FIG. 12 indicates a spheroidizing furnace. The spheroidizing furnace E is a cylindrical vertical furnace, and the burner 1 is mounted vertically downward on the ceiling (top) of the furnace so that the tip side thereof faces the inside of the furnace.

An air introduction passage F is connected near the bottom of the spheroidizing furnace E, from which cooling air can be introduced inside of the spheroidizing furnace E to lower the temperature of the discharged combustion gas.

The generated spheroidized particles are transferred by combustion gas from the vicinity of the bottom of the spheroidizing furnace A and sent to the inlet of the cyclone G.

In addition, a duct is provided at the outlet of the cyclone G, and the duct is connected to the inlet of the bag filter H.

The raw material powder is supplied from the raw material supply machine (feeder) A, and is transferred into the burner 1 along with the carrier gas supplied from the carrier gas supply device A'. The burner 1 is supplied with the first combustion-supporting gas from the first combustion-supporting gas supply facility C and the first fuel gas (substance containing no carbon source) from the first fuel gas supply facility D. Then, the exhaust gas containing the particles spheroidized in the flame in the spheroidizing furnace E is cooled (temperature diluted) by the air introduced from the air introduction passage F to the bottom of the spheroidizing furnace E, and the spheroidized particles are collected by the cyclone G and the bag filter H in the subsequent stage.

(Method for Producing Inorganic Spheroidized Particles)

Next, a method for producing spheroidized particles using the apparatus 10 provided with the burner 1 will be described. In the method for producing inorganic spheroidized particles of the present embodiment, the inorganic powder is melted and spheroidized by the burner flame formed by the combustion of the fuel gas and a combustion-supporting gas containing oxygen.

As shown in FIGS. 1 to 4, and FIG. 12, first, the raw material powder supplied from the raw material supply apparatus A is transferred into the raw material powder supply path 2A of the burner 1 by using the carrier gas supplied from the carrier gas supply apparatus A', and ejected from a plurality of the raw material powder ejection holes 2a toward the spheroidizing furnace E.

At the same time, a predetermined amount of the first fuel gas is sent from the first fuel gas supply facility D into the first fuel gas supply path 3A of the burner 1, and a predetermined amount of the first combustion-supporting gas is sent from the first combustion-supporting gas supply facility C into the first combustion-supporting gas supply path 4A. Then, a mixed gas of the first fuel gas and the first combustion-supporting gas is ejected toward the spheroidizing furnace E from the openings 6a of a plurality of the first premixing chambers 6 of the burner 1. At this time, the raw material powder is surrounded by the first flame and the second flame formed by the combustion of the mixed gas ejected from the openings 6a of the first premixing chambers 6. As a result, the inorganic powder as the raw material powder is melted and spheroidized.

The spheroidized particles are suspended in a mixed gas of the combustion gas generated from the burner 1 and the air introduced from the air introduction passage F, and sent into the cyclone G from the combustion gas outlet of the spheroidizing furnace E. By mixing air with the combustion gas, the temperature of the gas introduced into the cyclone G is lowered, and the temperature becomes suitable for collecting particles in the cyclone G.

In the cyclone G, coarse spheroidized particles are collected from the spheroidized particles suspended in the gas. The gas derived from the cyclone G is sent to the bag filter H, and fine spheroidized particles are collected from among the spheroidized particles.

In the method for producing inorganic spheroidized particles of the present embodiment, when the raw material powder is supplied to the burner flame together with the carrier gas by using the burner 1, the carrying vector of the raw material powder is changed one or more times from the axial direction to the radius of the burner 1. According to the burner 1, even when the raw material powder has a large particle size distribution, the particle group having a small particle diameter contained in the raw material powder can be set to an appropriate dispersed state, and the particle having a large particle diameter contained in raw material powder can be slowed down to an appropriate ejection speed. Therefore, the inorganic powder as the raw material powder can be efficiently melted and spheroidized.

As explained above, the burner (burner for producing inorganic spheroidized particles) according to the present embodiment includes the raw material powder supply path 2A arranged in the center of the burner 1 and which supplies inorganic powder as the raw material powder together with the carrier gas; the first supply path 2A extending in the axial direction of the burner 1; the first collision wall 2D, which is located at the tip of the first supply path 2A and intersects the axial direction of the burner 1; a plurality of the second supply paths 2B, which are branched from the tip of the first supply path 2A, and extend radially from the center of the burner 1 when the burner 1 is cross-sectionally viewed; a plurality of the dispersion chambers which are located at the tip of the second supply path 2B, communicate with the second supply path 2B, and have the space of which the cross-sectional area perpendicular to the extending direction of the second supply path 2B is larger than that of the second supply path 2B; and a plurality of the raw material powder ejection holes 2a which communicate with the dispersion chamber 2C and extend in the axial direction of the burner 1.

According to this burner 1, the raw material powder is dispersed at the first collision wall 2D located at the tip of the first supply path 2A. Then, the flow path of the raw material powder is changed to the second supply path 2B which extends radially from the axial direction of the burner 1. The raw material powder is dispersed again by the dispersion chamber 2C and the second collision wall 2F and then supplied to the raw material powder ejection holes 2a. The ejection direction of the raw material powder is changed to the axial direction of the burner 1. As a result, it is possible to evenly eject the raw material powder having an appropriate ejection speed and dispersibility into the burner flame from a plurality of the raw material powder ejection holes 2a.

As a result, even when the raw material powder has a large particle size distribution, the particle group having a small particle diameter contained in the raw material powder can be set to an appropriate dispersed state, and the particle group having a large particle diameter contained in raw material powder can be slowed down to an appropriate ejection speed. Therefore, the inorganic powder as a raw material powder can be efficiently melted and spheroidized.

Further, according to the apparatus for producing inorganic spheroidized particles 10 and the method for producing inorganic spheroidized particles of the present embodiment, since the burner 1 is used, the inorganic powder as a raw material powder can be efficiently melted and spheroidized.

Second Embodiment

Next, a second embodiment according to the present invention will be described.

A burner of the second embodiment differs from the burner 1 of the first embodiment in that the supply paths of the fuel gas and the combustion-supporting gas which form the first flame and the second flame described above are independent. Therefore, a burner 21 of the present embodiment will be described with reference to FIGS. 4 to 6. In the following description of the burner 21 of the present embodiment, the same components as those of the first embodiment are designated by the same reference numerals and the description thereof will be omitted.

(Burner for Producing Inorganic Spheroidized Particles)

Figure 5:
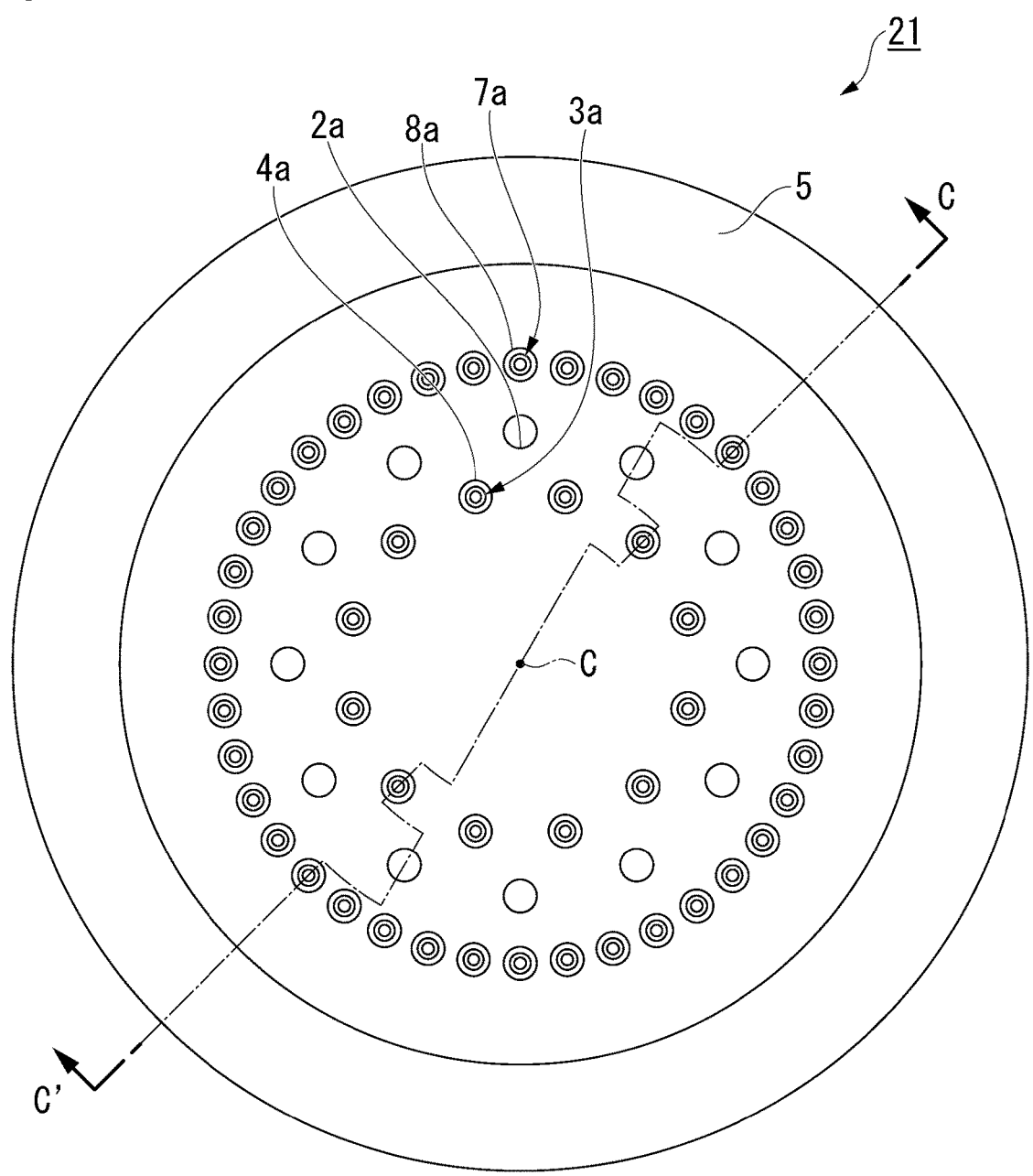
FIG. 5 is a plan view showing a burner of a second embodiment according to the present invention.
Figure 6:
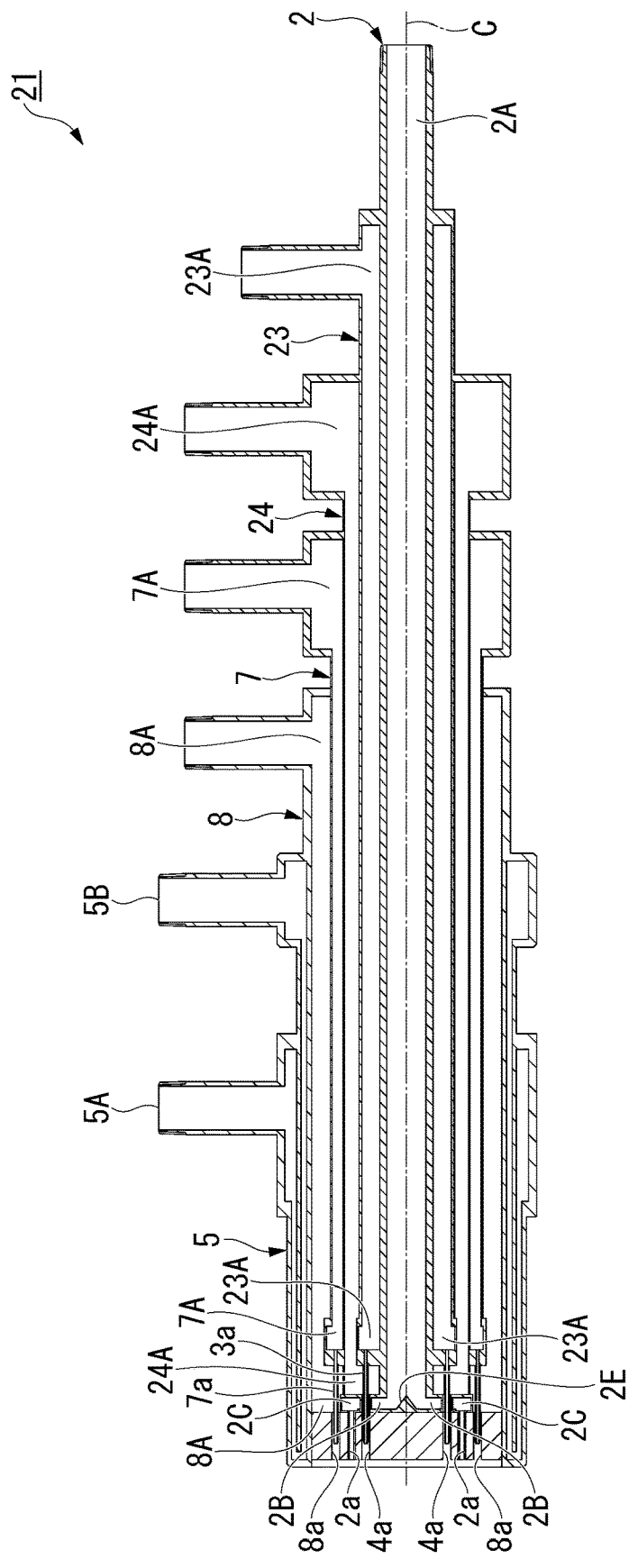
FIG. 6 is a cross-sectional view taken along the line C-C' shown in FIG. 5.
Figure 7:
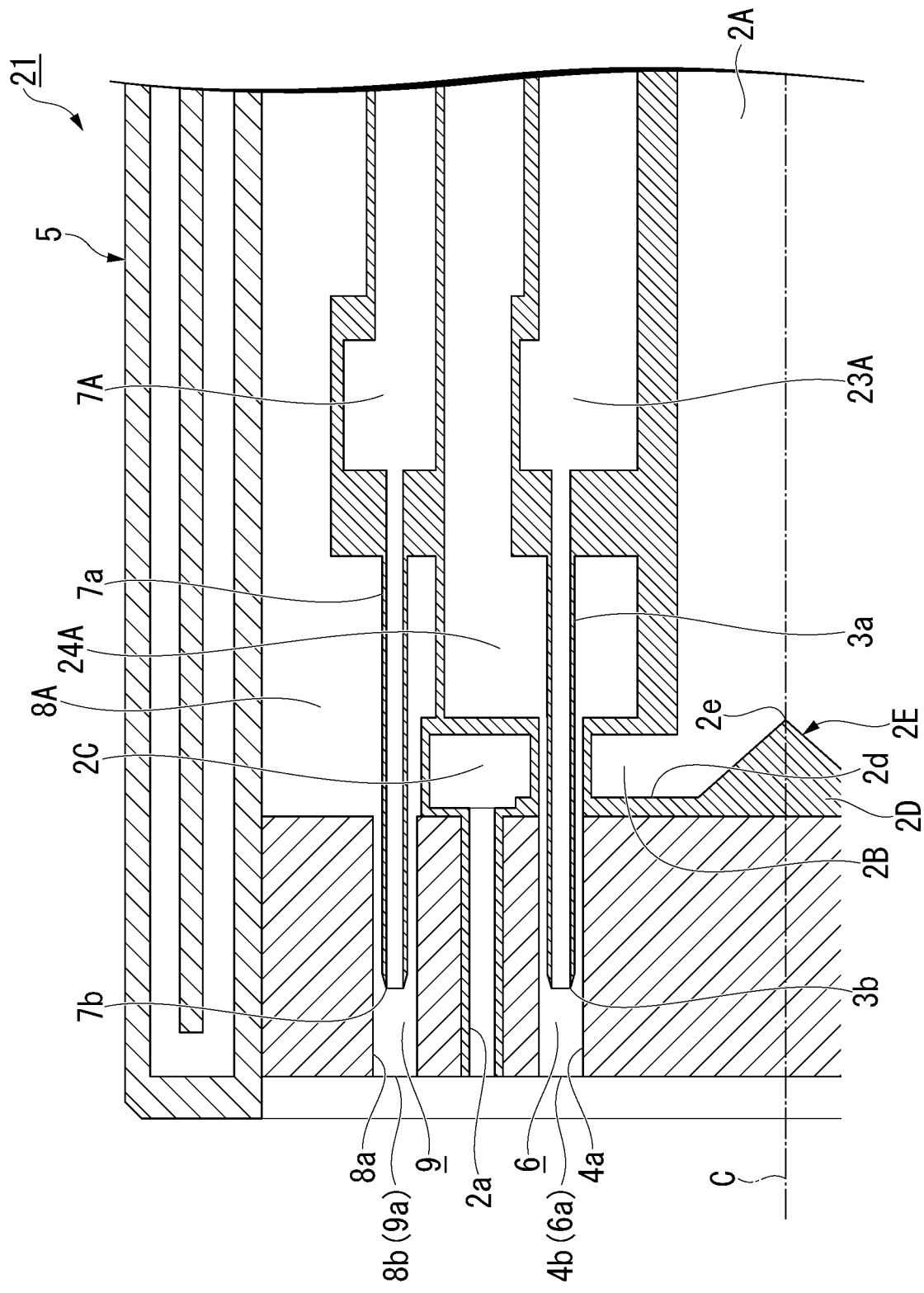
FIG. 7 is an enlarged cross-sectional view showing the burner shown in FIG. 6.

FIGS. 5 to 7 show the burner 21 for producing inorganic spheroidized particles (hereinafter, may be simply referred to as "burner") of the second embodiment according to the present invention. FIG. 5 is a plan view showing a burner of the second embodiment from the tip side of the burner. FIG. 6 is a cross-sectional view taken along the line C-C' shown in FIG. 5. FIG. 7 is an enlarged cross-sectional view of the tip side of the burner.

As shown in FIGS. 5 to 7, the burner 21 has a concentric multi-pipe structure including the raw material powder supply pipe 2, a first fuel supply pipe 23, and a first combustion-supporting gas supply pipe 24, a second fuel supply pipe 7, a second combustion-supporting gas supply pipe 8, and the water-cooling jacket 5 from the central axis C of the burner 1 toward the outside in the circumferential direction. Further, the burner 21 is an oxygen combustion burner using a fuel gas and a combustion-supporting gas containing oxygen.

As shown in FIG. 6, the first fuel supply pipe 23 is provided so as to cover the outside of the raw material powder supply pipe 2. The central axis of the first fuel supply pipe 23 and the central axis of the raw material powder supply pipe 2 coincide with each other, and the first fuel supply pipe 23 is provided coaxially with the raw material powder supply pipe 2.

The annular space provided between the first fuel supply pipe 23 and the raw material powder supply pipe 2 is a first fuel gas supply path 23A for supplying the first fuel gas. In other words, the first fuel gas supply path 23A is provided so as to cover the outer periphery of the first powder supply path 2A.

The base end side of the first fuel gas supply path 23A is connected to a first fuel gas supply source (not shown in figures).

As the first fuel gas, any substance can be used similarly to the first embodiment. The first fuel gas may be a substance containing a carbon source or a substance containing no carbon source. If necessary, the first fuel gas may be diluted with an inert gas such as nitrogen gas or argon gas.

The tip of the first fuel gas supply path 23A is on the base end side in the axial direction of the burner 21 with respect to the position at which the raw material powder supply path 2A branches into a plurality of the raw material powder supply branched flow paths 2B. Therefore, the first fuel gas supply path 23A is not provided on the outer periphery of the portion near the tip of the first powder supply path 2A.

The annular space near the tip of the first fuel gas supply path 23A has the same or a slightly larger outer diameter than that of the base end portion and the central portion. The outer periphery of the annular space near the tip of the first fuel gas supply path 23A is preferably inside the raw material powder ejection holes 2a. As a result, as shown in FIG. 5, when the tip of the burner 21 is viewed in plan view, the first fuel gas for forming a flame (first flame) can be supplied inside a plurality of the raw material powder ejection holes 2a.

As shown in FIGS. 6 and 7, a plurality of the first fuel gas ejection nozzles (first fuel supply branched flow paths) 3a extending in a direction parallel to the axial direction of the burner 21 are connected to the tip of the first fuel gas supply path 23A. The first fuel gas supply path 23A and the space inside the plurality of the first fuel gas ejection nozzles 3a communicate with each other. As a result, the fuel gas can be supplied from the first fuel gas supply path 23A to the plurality of the first fuel gas ejection nozzles 3a. In other words, the first fuel gas supply path 23A branches into a plurality of the first fuel gas ejection nozzles 3a at a portion near the tip of the burner 21.

As shown in FIG. 6, the first combustion-supporting gas supply pipe 24 is provided so as to cover the outside of the first fuel supply pipe 23. The central axis of the first combustion-supporting gas supply pipe 24 coincides with the central axis of the first fuel supply pipe 23, and the first combustion-supporting gas supply pipe 24 is provided coaxially with the first fuel supply pipe 23 and the raw material powder supply pipe 2.

The annular space provided between the first combustion-supporting gas supply pipe 24 and the first fuel supply pipe 23 is the first combustion-supporting gas supply path 24A for supplying the first combustion-supporting gas. In other words, the first combustion-supporting gas supply path 24A is provided so as to cover the tip and the outer periphery of the first fuel gas supply path 23A.

The base end side of the first combustion-supporting gas supply path 24A is connected to a first combustion-supporting gas supply source (not shown in figures).

The first combustion-supporting gas is not particularly limited as long as it is a gas capable of reacting with the first fuel gas to form a flame atmosphere, as in the first embodiment. Examples of the first combustion-supporting gas include oxygen, and oxygen-enriched air.

The tip of the first combustion-supporting gas supply path 24A is on the tip side in the axial direction of the burner 21 with respect to the position at which the raw material powder supply path 2A branches into a plurality of the raw material powder supply branched flow paths 2B. Therefore, the first combustion-supporting gas supply path 24A is provided so as to cover the outer periphery of the portion near the tip of the first powder supply path 2A.

The annular space near the tip of the first combustion-supporting gas supply path 24A has a smaller inner diameter than that of the base end portion and the central portion. The inner periphery of the annular space near the tip of the first combustion-supporting gas supply path 24A is preferably inside the raw material powder ejection hole 2a. As a result, as shown in FIG. 5, when the tip of the burner 21 is viewed in plan view, the first combustion-supporting gas for forming the first flame can be supplied inside the plurality of raw material powder ejection holes 2a.

As shown in FIGS. 6 and 7, the tip of the first combustion-supporting gas supply path 24A of which the diameter is expanded from the outside in the circumferential direction of the burner 21 toward the central axis C is connected to a plurality of the first combustion-supporting gas supply holes (first combustion-supporting gas supply branched flow paths) 4a which extend in a direction parallel to the axial direction of the burner 21. The first combustion-supporting gas supply path 24A and the space inside the plurality of the first combustion-supporting gas supply holes 4a communicate with each other. As a result, the first combustion-supporting gas can be supplied from the first combustion-supporting gas supply path 24A to a plurality of the first combustion-supporting gas supply holes 4a. In other words, the first combustion-supporting gas supply path 24A branches into a plurality of the first combustion-supporting gas supply holes 4a at the portion near the tip of the burner 21.

As shown in FIG. 6, the second fuel supply pipe 7 is provided so as to cover the outside of the first combustion-supporting gas supply pipe 24. The central axis of the first fuel supply pipe 23 coincides with the central axis of the first combustion-supporting gas supply pipe 24, and the second fuel supply pipe 7 is provided coaxially with the first combustion-supporting gas supply pipe 24.

The annular space provided between the second fuel supply pipe 7 and the first combustion-supporting gas supply pipe 24 is a second fuel gas supply path 7A for supplying the second fuel gas. In other words, the second fuel gas supply path 7A is provided so as to cover the outer periphery of the first combustion-supporting gas supply path 24A.

The base end side of the second fuel gas supply path 7A is connected to a second fuel gas supply source (not shown in figures).

As the second fuel gas, the same one as the first fuel gas can be used or a different one may be used.

If necessary, the second fuel gas may be diluted with an inert gas such as nitrogen gas or argon gas.

The tip of the second fuel gas supply path 7A is almost the same as that of the first fuel gas supply path 23A in the axial direction of the burner 21. Therefore, the second fuel gas supply path 7A is not provided on the outer periphery of the portion near the tip of the first powder supply path 2A.

The annular space near the tip of the second fuel gas supply path 7A has the same or a slightly larger outer diameter than that of the base end portion and the central portion. The outer periphery of the annular space near the tip of the second fuel gas supply path 7A is preferably outside the position of the raw material powder ejection holes 2a. As a result, as shown in FIG. 4, when the tip of the burner 21 is viewed in plan view, the second fuel gas for forming a flame (second flame) can be supplied to the outside of the plurality of raw material powder ejection holes 2a.

As shown in FIGS. 6 and 7, a plurality of second fuel gas ejection nozzles (second fuel supply branched flow path) 7a extending in a direction parallel to the axial direction of the burner 21 are connected to the tip of the second fuel gas supply paths 7A. The second fuel gas supply path 7A and the space inside the plurality of the second fuel gas ejection nozzles 7a communicate with each other. As a result, the second fuel gas can be supplied from the second fuel gas supply path 7A to the plurality of the second fuel gas ejection nozzles 7a. In other words, the second fuel gas supply path 7A branches into a plurality of the second fuel gas ejection nozzles 7a at the portion near the tip of the burner 21.

As shown in FIG. 6, the second combustion-supporting gas supply pipe 8 is provided so as to cover the outside of the second fuel supply pipe 7. The central axis of the second combustion-supporting gas supply pipe 8 coincides with the central axis of the second fuel supply pipe 7, and the second combustion-supporting gas supply pipe 8 is provided coaxially with the second fuel supply pipe 7 and the raw material powder supply pipe 2.

The annular space provided between the second combustion-supporting gas supply pipe 8 and the second fuel supply pipe 7 is a second combustion-supporting gas supply path 8A for supplying a second combustion-supporting gas. In other words, the second combustion-supporting gas supply path 8A is provided so as to cover the tip and the outer periphery of the second fuel gas supply path 7A.

The base end side of the second combustion-supporting gas supply path 8A is connected to a second combustion-supporting gas supply source (not shown in figures).

The second combustion-supporting gas is not particularly limited as long as it is a gas capable of reacting with the second fuel gas to form a flame atmosphere, as the first combustion-supporting gas. Examples of the second combustion-supporting gas include oxygen and oxygen-enriched air. The second combustion-supporting gas may have the same component as the first combustion-supporting gas, or may have a different component.

The tip of the second combustion-supporting gas supply path 8A is on the tip side in the axial direction of the burner 21 with respect to the position at which the raw material powder supply path 2A branches into a plurality of the raw material powder supply branched flow paths 2B. Therefore, the second combustion-supporting gas supply path 8A is provided so as to cover the outer periphery of the portion near the tip of the first combustion-supporting gas supply path 24.

The annular space near the tip of the second combustion-supporting gas supply path 8A has a smaller inner diameter than that of the base end portion and the central portion. The inner periphery of the annular space near the tip of the second combustion-supporting gas supply path 8A is preferably outside the position of the raw material powder ejection hole 2a. As a result, as shown in FIG. 5, when the tip of the burner 21 is viewed in plan view, the second combustion-supporting gas for forming a flame (second flame) can be supplied outside the plurality of the raw material powder ejection holes 2a.

As shown in FIGS. 6 and 7, the tip of the second combustion-supporting gas supply path 8A of which the diameter is expanded from the outside in the circumferential direction of the burner 21 toward the central axis C is connected to a plurality of second combustion-supporting gas supply holes (second combustion-supporting gas supply branched flow paths) 8a extending in a direction parallel to the axial direction of the burner 21. The second combustion-supporting gas supply path 8A and the space inside a plurality of the second combustion-supporting gas supply holes 8a communicate with each other. As a result, the second combustion-supporting gas can be supplied from the second combustion-supporting gas supply path 8A to a plurality of the second combustion-supporting gas supply holes 8a. In other words, the second combustion-supporting gas supply path 8A branches into a plurality of the second combustion-supporting gas supply holes 8a at the portion near the tip of the burner 21.

In the burner 21 of the present embodiment, as shown in FIG. 7, the second fuel gas ejection nozzle 7a is arranged inside the second combustion-supporting gas supply hole 8a. Further, a tip 7b of the second fuel gas ejection nozzle 7a is arranged inside the second combustion-supporting gas supply hole 8a. That is, the second fuel gas ejection nozzle 7a opens inside the second combustion-supporting gas supply hole 8a.

When the second fuel gas is ejected from the tip 7b of the second fuel gas ejection nozzle 7a into the inside of the second combustion-supporting gas supply hole 8a, the second combustion-supporting gas is supplied from the second combustion-supporting gas supply path 8A toward the inside of the second combustion-supporting gas supply hole 8a. Then, the second fuel gas and the second combustion-supporting gas are mixed inside the second combustion-supporting gas supply hole 8a in front of the tip 7b of the second fuel gas ejection nozzle 7a.

As described above, a space from the tip 7b of the second fuel gas ejection nozzle 7a to a tip 8b of the second combustion-supporting gas supply hole 8a is a second premixing chamber 9 for mixing the second fuel gas and the second combustion-supporting gas. Further, the opening of the tip 8b of the second combustion-supporting gas supply hole 8a is an opening 9a of the second premixing chamber 9.

In other words, the burner 21 of the present embodiment includes a plurality of the second premixing chambers 9. These second premixing chambers 9 are arranged at a position near to the tip of the burner 21 in the axial direction. The second premixing chamber 9 communicates with one of the second fuel gas ejection nozzles 7a and one of the second combustion-supporting gas supply holes 8a. The second premixing chamber 9 opens at the tip of the burner 21 in the axial direction.

A volume v2 of the second premixing chamber 9 is not particularly limited as long as the second fuel gas and the second combustion-supporting gas can be sufficiently mixed and there is no risk of flashback.

The volume v2 [$m^{-3}$] can be the same as the volume v1 of the first premixing chamber 6 described above. That is, when the total flow rate Q1 of the second fuel gas and the second combustion-supporting gas is 25 to 50 [$Nm^3/h$], the volume v2 [$m^3$] is preferably in a range from $3.0 \times 10^{-5}$ to $1.0 \times 10^{-3}$ [$m^3$], and more preferably in a range from $1.0 \times 10^{-4}$ to $1.0 \times 10^{-3}$ [$m^3$]. When the volume v2 is in the range from $1.0 \times 10^{-4}$ to $1.0 \times 10^{-3}$ [$m^3$], the second fuel gas and the second combustion-supporting gas can be sufficiently mixed in the second premixing chamber 9.

Further, an offset distance L2 from the tip 7b of the second fuel gas ejection nozzle 7a to the tip 8b of the second combustion-supporting gas supply hole 8a is preferably in a range from $1.0 \times 10^{-3}$ to $1.0 \times 10^{-1}$ [m], and more preferably in a range from $2 \times 10^{-3}$ to $5 \times 10^{-2}$ [in] as in the offset distance L1 described above.

Further, the number and the volume of the second premixing chamber 9 can be appropriately selected according to the supply amount of the mixed gas of the second fuel gas and the second combustion-supporting gas, and the number and the volume and the layout (arrangement) of the raw material powder ejection hole 2a.

In the second premixing chamber 9, the second fuel gas and the second combustion-supporting gas are mixed in advance and ejected as a mixed gas from the opening 9a in a direction parallel to the axial direction of the burner 21.

The burner 21 of the present embodiment includes a plurality of the first premixing chambers 6 and the second premixing chambers 9 having a small volume, the first fuel gas and the first combustion-supporting gas are mixed in advance in the first premixing chamber 6, and the second fuel gas and the second combustion-supporting gas are mixed in advance in the second premixing chamber 9. As a result, even when a substance containing no carbon source is used as the first fuel gas and the second fuel gas, the fuel gas and the combustion-supporting gas can be sufficiently mixed to improve the combustion efficiency, and there is no risk of flashback.

As shown in FIG. 5, when the tip of the burner 21 is viewed in plan view, the openings 6a of a plurality of the first premixing chambers 6 are arranged at equal intervals on the inside of the raw material powder ejection holes 2a arranged in an annular shape centered on the central axis C of the burner 21 so as to be concentric circles, and the openings 9a of a plurality of the second premixing chambers 9 are arranged at equal intervals on the outside of the raw material powder ejection holes 2a arranged in an annular shape centered on the central axis C of the burner 21 so as to be concentric circles. That is, the raw material powder ejection holes 2a are surrounded inside by the openings 6a of the first premixing chambers 6 and outside by the openings 9a of the second premixing chambers 9.

In other words, in order to form a flame (hereinafter, also referred to as "first flame") by the mixed gas of the first fuel gas and the first combustion-supporting gas in the central portion (center portion) of the burner 21, the openings 6a of a plurality of the first premixing chambers 6 are arranged in an annular shape, and a plurality of the raw material powder ejection holes 2a are arranged in an annular shape so as to surround the outer periphery of the first flame in the burner 21. Further, in order to form a flame (hereinafter, also referred to as "second flame") by the mixed gas of the second fuel gas and the second combustion-supporting gas so as to surround the outer periphery of the raw material powder ejection holes 2a, the openings 6a of a plurality of the second premixing chambers 6 are arranged in an annular shape. As a result, the heat of the flames can be efficiently transferred to the raw material powder ejected from the raw material powder ejection holes 2a, and the raw material powder can be efficiently melted.

Further, by forming the second flame so as to surround the outer periphery of the raw material powder ejection holes 2a, the entrained air from the periphery of the burner 21 or the combustion exhaust gas in the furnace can be blocked, so that the efficiency of melting and spheroidizing of the inorganic powder can be improved.

Further, according to the burner 21 of the present embodiment, the flow rate of the first fuel gas for forming the first flame and the flow rate of the second fuel gas for forming the second flame are independently controlled, and the flow rate of the first combustion-supporting gas for forming the first flame and the flow rate of the second combustion-supporting gas for forming the second flame can be controlled independently. This makes it possible to create an appropriate combustion state for the raw material powder ejected from the tip of the burner 21.

(Apparatus for Producing Inorganic Spheroidized Particles)

An apparatus 20 for producing inorganic spheroidized particles according to the present invention uses the burner 21 above instead of the burner B in the conventional apparatus 100 for producing inorganic spheroidized particles shown in FIG. 12.

(Method for Producing Inorganic Spheroidized Particles)

Next, a method for producing inorganic spheroidized particles using the apparatus 20 provided with the burner 21 above will be described.

In the method for producing inorganic spheroidized particles of the present embodiment, the inorganic powder is melted and spheroidized by a burner flame formed by combustion of a fuel gas and a combustion-supporting gas containing oxygen.

In the method for producing inorganic spheroidized particles of the present embodiment, when the raw material powder is supplied to the burner flame together with the carrier gas by using the burner 21, the carrying vector of the raw material powder is changed from the axial direction of the burner 21 to the radial direction one or more times as in the first embodiment described above. According to the burner 1, even when the raw material powder has a large particle size distribution, the particle group having a small particle diameter contained in the raw material powder can be set to an appropriate dispersed state, and the group of particles having a large particle diameter contained in raw material powder can be slowed down to an appropriate ejection speed. Therefore, the inorganic powder as a raw material powder can be efficiently melted and spheroidized.

According to the method for producing inorganic spheroidized particles of the present embodiment, in the burner 21, the supply of the fuel gas into the first fuel gas ejection nozzles 3a of the burner 21, and the supply of the fuel gas into the second fuel gas ejection nozzles 7a are independent. Therefore, the flow rate of the first fuel gas and the first combustion-supporting gas for forming the first flame and the flow rate of the second fuel gas and the second combustion-supporting gas for forming the second flame are independently controlled. This makes it possible to create an appropriate combustion state for the raw material powder ejected from the tip of the burner 21.

Further, according to the method for producing inorganic spheroidized particles of the present embodiment, the supply of the fuel gas and the combustion-supporting gas to the first and second fuel gas ejection nozzles of the burner 21 is independent of each other. Therefore, it is possible to supply a substance containing no carbon source such as ammonia ($NH_3$) and hydrogen ($H_2$) to both the first and second fuel gas ejection nozzles as the fuel gas. It is also possible to supply a substance containing no carbon source to one of the first and second fuel gas ejection nozzles as the fuel and supply a substance containing a carbon source to the other of the first and second fuel gas ejection nozzles as a fuel for auxiliary combustion.

As the fuel for auxiliary combustion, for example, a gaseous fuel such as methane ($CH_4$) or propane ($C_3H_8$) can be used. Further, if the apparatus 10 has a liquid atomization mechanism, a liquid fuel such as kerosene or alcohol can also be used.

In particular, ammonia has a lower combustion property than that of the conventional gaseous fuel containing a carbon source or hydrogen. Accordingly, when ammonia is used as the fuel gas, the flame temperature of the burner is raised while reducing the carbon dioxide generated during combustion by supplying the fuel for auxiliary combustion to the first fuel gas ejection nozzles 3a or the second fuel gas ejection nozzles 7a. As a result, the raw material powder can be efficiently melted. Further, the fuel for auxiliary combustion may be used only at the time of ignition, and the supply of the fuel for auxiliary combustion may be stopped after the combustion of the burner 21 is stabilized.

The technical scope of the present invention is not limited to the embodiments above, and various modifications can be made without departing from the spirit of the present invention. For example, in the burners 1 and 21 of the first and second embodiments described above, as shown in FIG. 4, the embodiment in which one raw material powder supply path 2A branches to eight second supply paths 2B, and one dispersion chamber 2C and one raw material powder ejection hole 2a are provided at the tip of the second supply path 2B has been described, but the present invention is not limited thereto.

Figure 8:
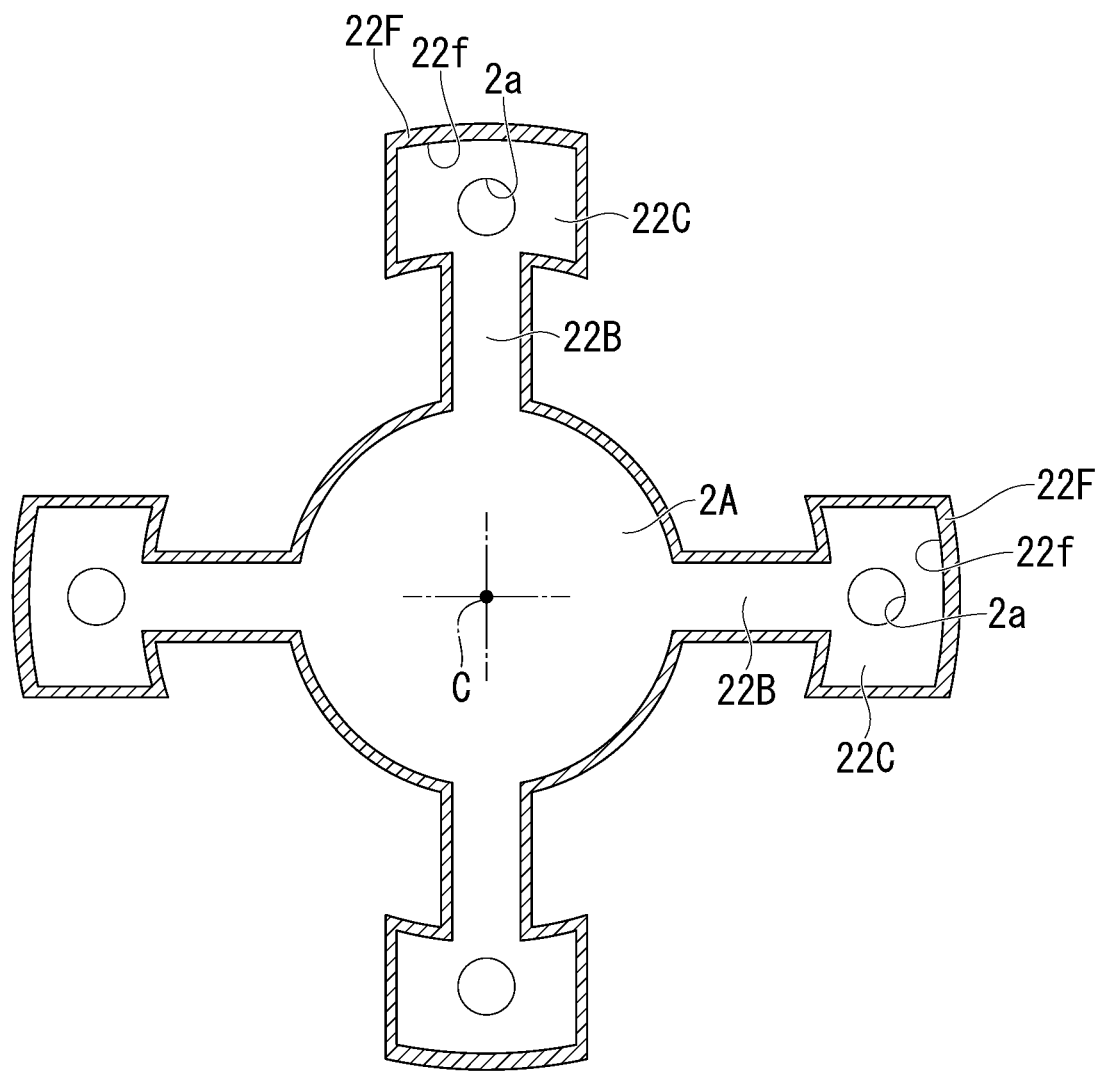
FIG. 8 is a cross-sectional view showing a modified raw material powder supply path in a burner according to the present invention.
Figure 9:
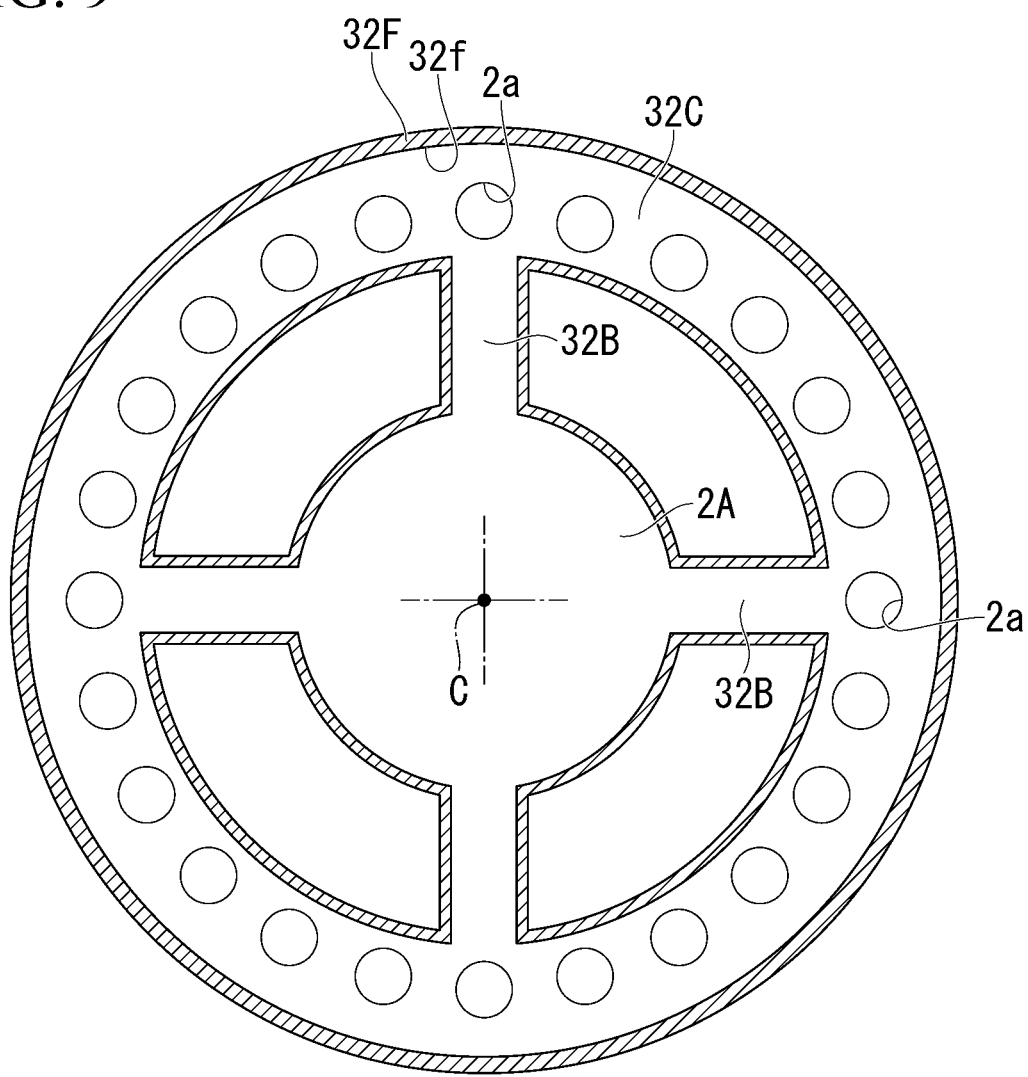
FIG. 9 is a cross-sectional view showing another modified raw material powder supply path in a burner according to the present invention.

FIGS. 8 and 9 are cross-sectional views showing a modified raw material powder supply path in which a portion near the tip of the raw material powder supply path corresponding to the cross-sectional view taken along the line B-B' in FIG. 3 is shown.

In the burner of the present invention, as in the first modification shown in FIG. 8, the raw material powder supply path may include one first supply path 2A, four second supply paths 22B, four dispersion chambers 22C, and four raw material powder ejection holes 2a.

Specifically, when the raw material powder supply pipe 2 is cross-sectionally viewed in a direction perpendicular to the axial direction of the burner 1, the first supply path 2A extends radially from the center of the burner 1 and branches into four second supply paths 22B so as to divide the tip of the first supply path 2A into four equal parts in the circumferential direction. Each of the four second supply paths 22B communicate with the first supply paths 2A at the base end and communicate with each of the dispersion chambers 22C at the tip. Further, each of the dispersion chambers 22C communicates with each of the raw material powder ejection holes 2a.

That is, in the burner 1 of the present invention, as long as the raw material powder supply path branches from the first supply path to a plurality of the second supply paths, the number of the second supply paths (number of branches) is not particularly limited.

Further, in the burner of the present invention, as shown in the second modification shown in FIG. 9, the raw material powder supply path may include one first supply path 2A, four second supply paths 32B, one dispersion chamber 22C, and twenty-four raw material powder ejection holes 2a.

Specifically, one first supply path 2A branches into four second supply paths 22B so as to divide the first supply path 2A as in the first modified embodiment. Each of the four second supply paths 32B communicates with the first supply paths 2A at the base end and communicates with each of the dispersion chambers 32C at the tip.

When the burner is cross-sectionally viewed in a direction perpendicular to the axial direction of the burner 1, the dispersion chamber 32C has an annular shape centered on the central axis C of the burner 1 similar to the first supply path 2A, and is located outside the first supply path 2A. When cross-sectionally viewed in a direction perpendicular to the axial direction of the burner 1, the dispersion chamber 32C has a cylindrical second collision wall 32F. Further, the inner peripheral wall surface of the second collision wall 32F is the second wall surface 32f.

Further, when cross-sectionally viewed in a direction perpendicular to the axial direction of the burner 1, one dispersion chamber 32C communicates with each of twenty-four raw material powder ejection holes 2a evenly arranged on the circumference of a circle centered on the central axis C of the burner 1.

That is, in the burner 1 of the present invention, as long as the raw material powder supply path includes one or more dispersion chambers, the number of the second supply paths and the raw material powder ejection holes 2a is not particularly limited.

Further, in the burners 1 and 21 of the first and second embodiments above, as shown in FIGS. 2 and 3, the embodiment in which the dispersion mechanism 2E located on the first wall surface 2d of the first collision wall 2D has a cone shape has been described, but the present invention is not limited thereto.

Figure 10:
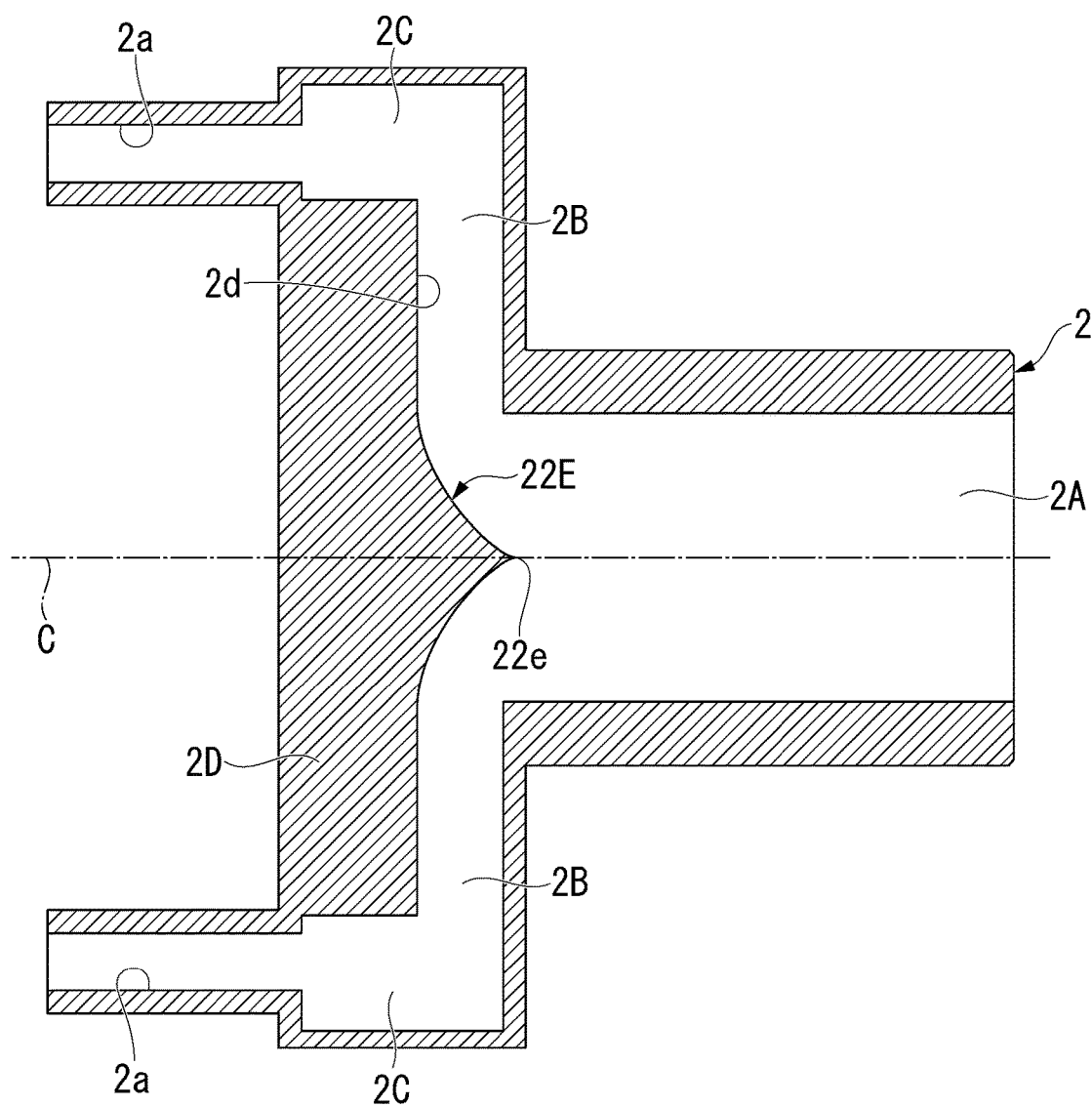
FIG. 10 is a cross-sectional view showing a modified dispersion mechanism in a burner according to the present invention.
Figure 11:
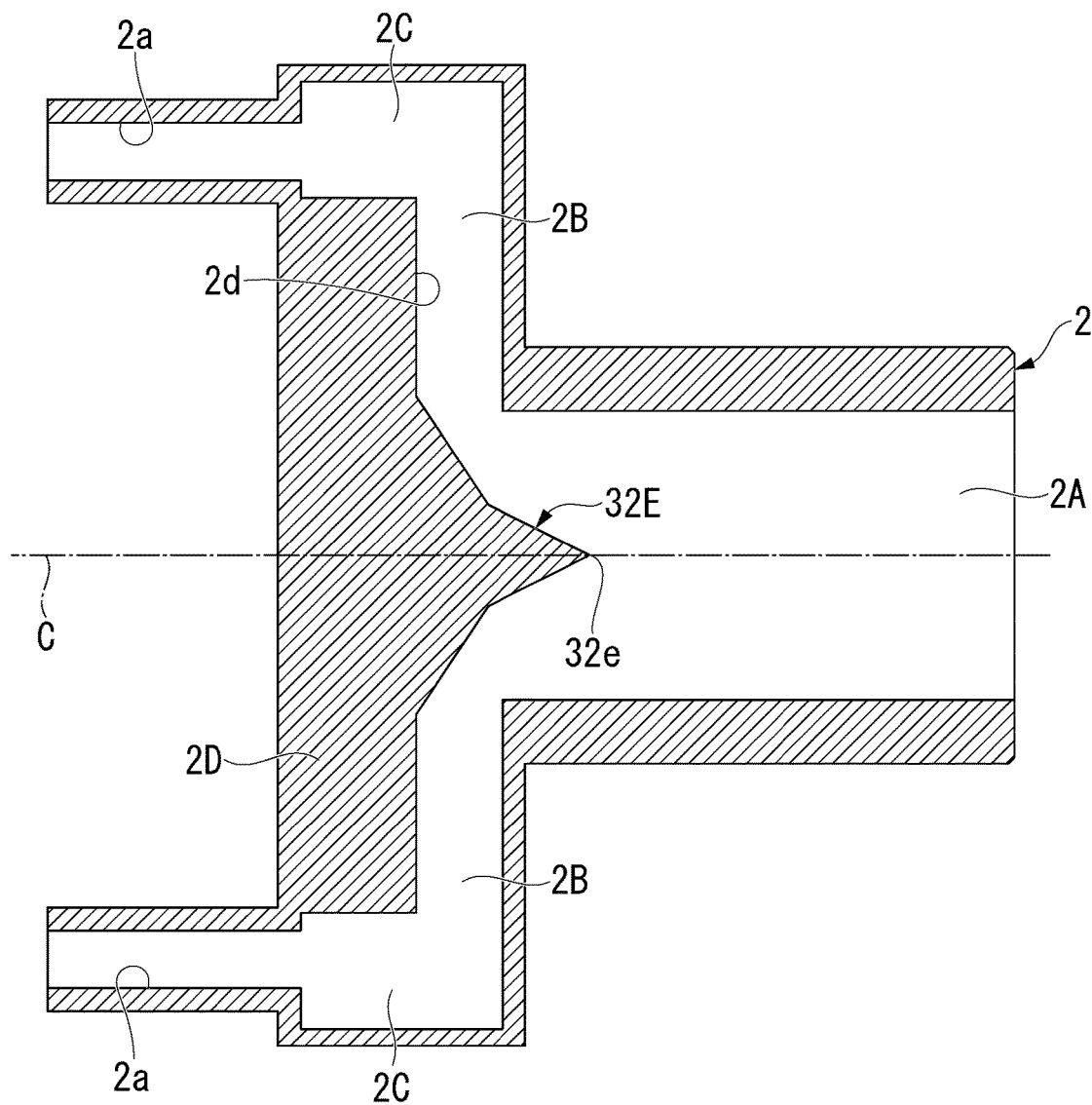
FIG. 11 is a cross-sectional view showing another modified dispersion mechanism in a burner according to the present invention.

FIGS. 10 and 11 are cross-sectional views showing a modified dispersion mechanism in which a portion near the tip of the raw material powder supply path 2A corresponding to the cross-sectional view along the line A-A' in FIG. 1 is shown.

In the burner of the present invention, as in the first modification shown in FIG. 10, the dispersion mechanism 22E is a convex portion (convex body) having one top portion 22e protruding from the first wall surface 2d, and the side surfaces from the top 22e to the first wall surfaces 2d may be curved. According to the dispersion mechanism 22E having such a configuration, the carrying vector of the raw material powder can be continuously changed one or more times from the axial direction of the burner 1 to the radial direction.

Further, in the burner of the present invention, as in the second modification shown in FIG. 11, the dispersion mechanism 32E is a convex portion (convex body) having one top portion 32e protruding from the first wall surface 2d, and the side surfaces from the top 32e to the first wall surface 2d may have two slopes with different slope angles. According to the dispersion mechanism 32E having such a configuration, the carrying vector of the raw material powder can be changed twice from the axial direction of the burner 1 to the radial direction.

Further, in the burners 1 and 21 of the first and second embodiments above, as shown in FIGS. 2 and 3, the first wall surface 2d of the first collision wall 2D, which intersects perpendicularly with the axial direction of the burner 1, is flat, but the first collision wall 2D is not limited to thereto. The first wall surface 2d may be a bowl curved surface.

Further, in the burners 1 and 21 of the first and second embodiments above, as shown in FIGS. 2 and 3, when the tip of the burner 1 and 21 is cross-sectionally viewed in a direction parallel to the axial direction of the burner 1 and 21, the direction in which the first supply path 2A extends and the direction in which the second supply path 2B extends are orthogonal to each other, but the present invention is not limited to thereto. As long as when the burner 1 and 21 is cross-sectionally viewed, the second supply path 2B can change the carrying vector of the raw material powder carried by the carrier gas into the radial direction of the circle centered on the central axis C of the burner 1 and 21, the second supply path 2B may not be perpendicular to the first supply path 2A.

Further, in the burners 1 and 21 of the first and second embodiments above, as shown in FIG. 4, the second wall surface 2f is bowl curved, but the present invention is not limited to thereto. The second wall surface 2f may be flat.

Further, in the method for producing inorganic spheroidized particles of the second embodiment above, when ammonia is used as the fuel gas, the fuel for auxiliary combustion is used at the time of ignition of the burner 21, but it may be applied to the first embodiment.

The mode for supplying the fuel for auxiliary combustion to the burner 1 of the first embodiment and the burner 21 of the second embodiment is not particularly limited.

For example, the first fuel gas supply path 3A or the second fuel gas supply path 7A may be connected to a supply source of the fuel for auxiliary combustion (not shown in figures), and the fuel for auxiliary combustion may be supplied to the first fuel gas ejection nozzle 3a or the second fuel gas ejection nozzle 7a.

Further, in the first premixing chamber 6 or the second premixing chamber 9 to which the fuel for auxiliary combustion is supplied, it may be possible to switch from the mixed combustion of ammonia and the fuel for auxiliary combustion to the combustion of 100% ammonia.

INDUSTRIAL APPLICABILITY

The present invention provides a burner for producing inorganic spheroidized particles, an apparatus for producing inorganic spheroidized particles, and a method for producing inorganic spheroidized particles which can efficiently melt and spheroidize even inorganic powder with a large particle size distribution.

DESCRIPTION OF REFERENCE NUMERAL 1, 21 burner (burner for producing inorganic spheroidized particles)
2A first supply path (raw material powder supply path)
2B, 22B, 32B second supply path (raw material powder supply path)
2C, 22C, 32C dispersion chamber (raw material powder supply path)

2D first collision wall
2E, 22E, 32E dispersion mechanism
2F second collision wall
2a raw material powder ejection hole
2d first wall surface
2e top portion
2f second wall surface
3A, 23A first fuel gas supply path
3a first fuel gas ejection nozzle (first fuel supply branched flow path)
3b tip of the first fuel supply branched flow path
4A, 24A first combustion-supporting gas supply path
4a first combustion-supporting gas supply hole (first combustion-supporting gas supply branched flow path)
4b tip of the first combustion-supporting gas supply branched flow path
6 first premixing chamber
6a opening of the first premixing chamber
7 second fuel gas supply path
7a second fuel gas ejection nozzle (second fuel supply branched flow path)
7b tip of the second fuel supply branched flow path
8 second combustion-supporting gas supply path
8a second combustion-supporting gas supply hole (second combustion-supporting gas supply branched flow path)
8b tip of the second combustion-supporting gas supply branched flow path
9 second premixing chamber
9a opening of the second premixing chamber
10, 20 apparatus for producing inorganic spheroidized particles
C central axis of burner
E spheroidizing furnace
G cyclone
H bag filter

The invention claimed is:

1. A burner for producing inorganic spheroidized particles using a fuel gas and a combustion-supporting gas containing oxygen, comprising;
a raw material powder supply path configured to supply inorganic powder as raw material powder together with a carrier gas;
a first fuel gas supply path configured to supply a first fuel gas; and
a first combustion-supporting gas supply path configured to supply a first combustion-supporting gas;
wherein the raw material powder supply path comprises:
a first supply path configured to be located in the center of the burner and extend in an axial direction of the burner;
a first collision wall configured to be located at the top of the first supply path, and intersect perpendicularly with the axial direction of the burner;
a plurality of second supply paths configured to be branched from the top of the first supply path, and extend radially from the center of the burner when the burner is cross-sectionally viewed;
a dispersion chamber configured to be located at the top of each respective second supply path of the plurality of second supply paths, to communicate with the respective second supply path, and to have a space in which the cross-sectional area in the direction perpendicular to the direction in which the respective second supply path extends is larger than the cross-sectional area in the respective second supply path;
one or more raw material ejection holes configured to communicate with each said dispersion chamber, and extend in the axial direction; and
a dispersion mechanism configured to be located at a wall surface of the first collision wall, and change a carrying vector of the raw material powder from the axial direction toward the radial direction of the burner at least once, and
wherein the dispersion mechanism is a convex portion having one top portion protruding from the wall surface.

2. The burner for producing inorganic spheroidized particles according to claim 1,
wherein the top portion is located on the central axis of the burner.

3. The burner for producing inorganic spheroidized particles according to claim 1,
wherein each said dispersion chamber comprises a second collision wall which intersects a direction in which the second supply path extends.

4. The burner for producing inorganic spheroidized particles according to claim 3,
wherein when the burner is viewed in plan view, the raw material powder ejection hole is located closer to the center than the second collision wall.

5. An apparatus for producing inorganic spheroidized particles, comprising:
a burner according to claim 1,
a vertical spheroidizing furnace in which the burner for producing inorganic spheroidized particles is connected vertically downward to the top thereof; and
a cyclone and a bag filter provided in a subsequent stage of the spheroidizing furnace.

6. A method for producing inorganic spheroidized particles in which inorganic powder as raw material powder is melted and spheroidized by a burner flame formed by combustion of a fuel gas and a combustion-supporting gas containing oxygen using the burner for producing inorganic spheroidized particle according to claim 1,
wherein the method comprises changing a carrying vector of the raw material powder one or more times from the axial direction to the radial direction of the burner when the raw material powder is supplied in the burner flame together with a carrying gas.

7. The method for producing inorganic spheroidized particles according to claim 6,
wherein the fuel gas and the combustion-supporting gas are supplied into a plurality of the premixing chambers, mixed in advance, combusted to generate a flame, and the inorganic powder is sent into the flame.

8. A burner for producing inorganic spheroidized particles using a fuel gas and a combustion-supporting gas containing oxygen, comprising;
a raw material powder supply path configured to supply inorganic powder as raw material powder together with a carrier gas;
a first fuel gas supply path configured to supply a first fuel gas; and
a first combustion-supporting gas supply path configured to supply a first combustion-supporting gas;
wherein the raw material powder supply path comprises:
a first supply path configured to be located in the center of the burner and extend in an axial direction of the burner;
a first collision wall configured to be located at the top of the first supply path, and intersect perpendicularly with the axial direction of the burner;

a plurality of second supply paths configured to be branched from the top of the first supply path, and extend radially from the center of the burner when the burner is cross-sectionally viewed;

a dispersion chamber configured to be located at the top of each respective second supply path of the plurality of second supply paths, to communicate with the respective second supply path, and to have a space in which the cross-sectional area in the direction perpendicular to the direction in which the respective second supply path extends is larger than the cross-sectional area in the respective second supply path;

one or more raw material ejection holes configured to communicate with each said dispersion chamber, and extend in the axial direction, and wherein when a tip of the burner is viewed in plan view, openings of the raw material powder ejection holes are arranged on a circumference of a circle which is centered on the central axis of the burner, and has a diameter larger than a diameter of the first supply path.

9. A burner for producing inorganic spheroidized particles using a fuel gas and a combustion-supporting gas containing oxygen, comprising;

a raw material powder supply path configured to supply inorganic powder as raw material powder together with a carrier gas;

a first fuel gas supply path configured to supply a first fuel gas;

a first combustion-supporting gas supply path configured to supply a first combustion-supporting gas; and a plurality of first premixing chambers configured to be located at a position near a tip of the burner, and mix the first fuel gas and the first combustion-supporting gas, wherein the raw material powder supply path comprises:

a first supply path configured to be located in the center of the burner and extend in an axial direction of the burner;

a first collision wall configured to be located at the top of the first supply path, and intersect perpendicularly with the axial direction of the burner;

a plurality of second supply paths configured to be branched from the top of the first supply path, and extend radially from the center of the burner when the burner is cross-sectionally viewed;

a dispersion chamber configured to be located at the top of each respective second supply path of the plurality of second supply paths, to communicate with the respective second supply path, and have a space in which the cross-sectional area in the direction perpendicular to the direction in which the respective second supply path extends is larger than the cross-sectional area in the respective second supply path;

one or more raw material ejection holes configured to communicate with each said dispersion chamber, and extend in the axial direction, and wherein the first fuel gas supply path branches into a plurality of first fuel supply branched flow paths near the tip of the burner in the axial direction, wherein the first combustion-supporting gas supply path branches into a plurality of first combustion-supporting gas supply branched flow paths near the tip of the burner in the axial direction, wherein a respective first premixing chamber of the plurality of first premixing chambers is configured to communicate with each of the first fuel supply branched flow paths and each of the first combustion-supporting gas supply branched flow paths, wherein each of a plurality of the first premixing chambers has an opening at the tip of the burner in the axial direction, wherein the first fuel supply branched flow paths are arranged inside the first combustion-supporting gas supply branched flow paths, wherein a tip of each respective first fuel supply branched flow path of the plurality of first fuel supply branched flow paths is arranged inside each respective first combustion-supporting gas supply branched flow path of the plurality of first combustion-supporting gas supply branched flow paths, a space from the tip of the respective first fuel supply branched flow path to a of the respective first combustion-supporting gas supply branched flow path is the respective first premixing chamber, wherein an opening at the tip of the respective first combustion-supporting gas supply branched flow path is an opening of the respective first premixing chamber, and wherein when the tip of the burner is viewed in plan view, the openings of a plurality of the first premixing chambers are arranged in an annular shape centered on the central axis of the burner on either or both the inside and outside of the raw material powder ejection holes arranged in an annular shape.

10. A burner for producing inorganic spheroidized particles using a fuel gas and a combustion-supporting gas containing oxygen, comprising;

a raw material powder supply path configured to supply inorganic powder as raw material powder together with a carrier gas;

a first fuel gas supply path configured to supply a first fuel gas;

a first combustion-supporting gas supply path configured to supply a first combustion-supporting gas;

a plurality of first premixing chambers configured to be located at a position near a tip of the burner, and mix the first fuel gas and the first combustion-supporting gas;

a second fuel gas supply path configured to supply a second fuel gas;

a second combustion-supporting gas supply path configured to supply a second combustion-supporting gas; and a plurality of second premixing chambers configured to be located at a position near the tip of the burner in the axial direction, and mix the second fuel gas and the second combustion-supporting gas;

wherein the raw material powder supply path comprises:

a first supply path configured to be located in the center of the burner and extend in an axial direction of the burner;

a first collision wall configured to be located at the top of the first supply path, and intersect perpendicularly with the axial direction of the burner;

a plurality of second supply paths configured to be branched from the top of the first supply path, and extend radially from the center of the burner when the burner is cross-sectionally viewed;

a dispersion chambers configured to be located at the top of each respective second supply path of the plurality of second supply paths, to communicate with the respective second supply path, and to have a space in which the cross-sectional area in the direction perpendicular to the direction in which the respective second supply path extends is larger than the cross-sectional area in the respective second supply path;

one or more raw material ejection holes configured to communicate with each said dispersion chamber, and extend in the axial direction, and wherein the first fuel gas supply path branches into a plurality of first fuel supply branched flow paths near the tip of the burner in the axial direction, wherein the first combustion-supporting gas supply path branches into a plurality of first combustion-supporting gas supply branched flow paths near the tip of the burner in the axial direction, wherein each respective first premixing chamber is the plurality of first premixing chambers communicates with a respective first fuel supply branched flow path of the plurality of the first fuel supply branched flow paths and a respective first combustion-supporting gas supply branched flow path of the first combustion-supporting gas supply branched flow paths, wherein each of a plurality of the first premixing chambers has an opening at the tip of the burner in the axial direction, wherein the first fuel supply branched flow paths are arranged inside the first combustion-supporting gas supply branched flow paths, wherein a tip of the respective first fuel supply branched flow path is arranged inside the respective first combustion-supporting gas supply branched flow path, a space from the tip of the respective first fuel supply branched flow path to a tip of the respective first combustion-supporting gas supply branched flow path is the respective first premixing chamber, wherein an opening at the tip of the respective first combustion-supporting gas supply branched flow path is an opening of the respective first premixing chamber, and wherein the second combustion-supporting gas supply path branches into a plurality of second combustion-supporting gas supply branched flow paths at a portion near the tip of the burner;

wherein a tip of a second fuel supply branched flow path is arranged inside a respective second combustion-supporting gas supply branched flow path of the plurality of second combustion-supporting gas supply branched flow paths, and a space from the tip of the second fuel supply branched flow path to a tip of the respective second combustion-supporting gas supply branched flow path is a respective second premixing chamber of the plurality of second premixing chambers;

wherein an opening of the tip of the respective second combustion-supporting gas supply branched flow path is an opening of the respective second premixing chamber, and wherein when the tip of the burner is viewed in plan view, the openings of a plurality of the first premixing chambers are arranged in an annular shape centered on the central axis of the burner on either the inside or the outside of the opening of the raw material powder ejection holes arranged in an annular shape, and the openings of a plurality of the second premixing chambers are arranged in an annular shape centered on the central axis of the burner on the other side.

\* \* \* \* \*